United States Patent [19]
Ebcioglu et al.

[11] Patent Number: 6,112,299
[45] Date of Patent: Aug. 29, 2000

[54] METHOD AND APPARATUS TO SELECT THE NEXT INSTRUCTION IN A SUPERSCALAR OR A VERY LONG INSTRUCTION WORD COMPUTER HAVING N-WAY BRANCHING

[75] Inventors: Kemal Ebcioglu, Somers, N.Y.; Kenneth J. Kiefer; David Arnold Luick, both of Rochester, Minn.; Gabriel Mauricio Silberman, Millwood, N.Y.; Philip Braun Winterfield, Rochester, Minn.

[73] Assignee: International Business Machines Corporation, Armonk, N.Y.

[21] Appl. No.: 09/001,527

[22] Filed: Dec. 31, 1997

[51] Int. Cl.[7] .................................................. G06F 9/38
[52] U.S. Cl. .............................. 712/236; 712/24; 711/127
[58] Field of Search ....................... 712/236, 24; 711/127

[56] References Cited

U.S. PATENT DOCUMENTS

| | | | |
|---|---|---|---|
| 4,295,193 | 10/1981 | Pomcrene | ................................. 364/200 |
| 4,777,587 | 10/1988 | Case et al. | . |

(List continued on next page.)

FOREIGN PATENT DOCUMENTS

| | | | |
|---|---|---|---|
| 0496407 | 7/1992 | European Pat. Off. | . |
| 0592125 | 4/1994 | European Pat. Off. | . |
| 0770955 | 5/1997 | European Pat. Off. | . |
| 4983342 | 8/1974 | Japan | . |
| 1214981 | 8/1989 | Japan | . |
| 2077940 | 3/1990 | Japan | . |
| 4239324 | 8/1992 | Japan | ................................. G06F 9/38 |
| 6139075 | 5/1994 | Japan | . |
| 6208463 | 7/1994 | Japan | ................................. G06F 9/38 |
| 7084797 | 3/1995 | Japan | . |
| 7182169 | 7/1995 | Japan | . |
| 7281896 | 10/1995 | Japan | . |
| 8063357 | 3/1996 | Japan | . |
| 8249180 | 9/1996 | Japan | ................................. G06F 9/38 |
| 9427216 | 11/1994 | WIPO | . |
| 9629645 | 9/1996 | WIPO | . |

OTHER PUBLICATIONS

IBM Research Report, RC 13795 (#59501), Nov. 23, 1987, "Some Design Ideas for a VLIW Architecture for Sequential–Natured Software" by Kemal Ebcioglu.

IEEE Computer, Jun. 1993, pp. 39–56, "An Architectural Framework for Supporting Heterogeneous Instruction–Set Architectures" by Gabriel M. Silberman and Kemal Ebcioglu.

IEEE Comp–Con 84 Proceedings, pp. 299–305, "VLIW Machines: Multiprocessors We Can Actually Program" by Joseph A. Fisher and John J. O'Donnell.

(List continued on next page.)

*Primary Examiner*—William M. Treat
*Attorney, Agent, or Firm*—Karuna Ojanen

[57] ABSTRACT

In a computer capable of executing a superscalar and a very long instruction word instruction wherein the computer has compiled a number of primitive operations that can be executed in parallel into a single instruction having multiple parcels and each of the parcels correspond to an operation, the invention is an improved instruction cache to store all potential subsequent instructions and a method to select the subsequent instruction when several possible branches of execution are probable and must be evaluated. All branch conditions and all addresses of potential subsequent instructions of an instruction are replicated and stored in the instruction cache. All potential subsequent instructions are stored in the same block of the instruction cache having the same next address; individual instructions are identified by the replicated offset addresses. Further the instruction cache is divided into minicaches, each minicache to store one parcel, which allows rapid autonomous execution of each parcel. Simultaneously, all branch conditions are evaluated in parallel to determine the next instruction and all offset addresses are decoded in parallel. Only after the control flow or the branch taken, or the subsequent or next instruction is determined, are the results of that branch stored and the decoded addresses are used to late select the next instruction from the instruction cache.

17 Claims, 17 Drawing Sheets

U.S. PATENT DOCUMENTS

| | | |
|---|---|---|
| 4,833,599 | 5/1989 | Colwell et al. . |
| 5,127,092 | 6/1992 | Gupta et al. . |
| 5,301,340 | 4/1994 | Cook . |
| 5,317,703 | 5/1994 | Hiraoka et al. . |
| 5,333,280 | 7/1994 | Ishikawa et al. . |
| 5,333,283 | 7/1994 | Emma et al. . |
| 5,381,533 | 1/1995 | Peleg et al. . |
| 5,396,640 | 3/1995 | Ikenaga et al. . |
| 5,404,469 | 4/1995 | Chung et al. . |
| 5,442,760 | 8/1995 | Rustad et al. . |
| 5,442,762 | 8/1995 | Kato et al. . |
| 5,450,556 | 9/1995 | Slavenburg et al. . |
| 5,450,557 | 9/1995 | Kopp et al. . |
| 5,471,593 | 11/1995 | Branigin . |
| 5,481,736 | 1/1996 | Schwartz et al. . |
| 5,485,629 | 1/1996 | Dulong . |
| 5,500,942 | 3/1996 | Eickemeyer et al. . |
| 5,502,826 | 3/1996 | Vassiliadis et al. . |
| 5,509,129 | 4/1996 | Guttag et al. . |
| 5,511,172 | 4/1996 | Kimura et al. . |
| 5,513,363 | 4/1996 | Kumar et al. . |
| 5,517,442 | 5/1996 | Kirihata et al. . |
| 5,517,628 | 5/1996 | Morrison et al. . |
| 5,574,939 | 11/1996 | Keckler et al. . |

OTHER PUBLICATIONS

IEEE Proceedings of the 10th Symposium on Computer Architectures, pp. 140–150, Jun. 1983, "Very Long Instruction Word Architectures and the ELI–512" by Joseph A. Fisher.

IEEE CS Press, Los Alamitos, Calif., Order No. 805, 1987, pp. 180–192, "A VLIW Architecture for a Tarce Scheduling Compiler" by Robert P. Colwell et al.

IEEE Proceedings of the 26th Annual International Symposium on Microarchitecture, 1993, pp. 193–201, "MIDEE: Smoothing Branch and Instruction Cache Miss Penalties on Deep Pipelines" by Nathalie Drach and Andre Seznec.

IEEE Proceedings of the 1993 International Conference on Computer Design: VLSI Press, pp. 126–131, "Speculative Computation for Coprocessor Synthesis" by Ulrich Holtmann and Rolf Ernst.

IEEE Transactions on Parallel and Distributed Systems, vol. 6, No. 8, Aug. 1993, pp. 850–862, "Generalized Multiway Branch Unit for VLIW Microprocessors" by Soo–Mook Moon and Scott D. Carson.

IEEE Proceedings of the 28th Annual International Symposium on Microarchitecture, 1995, pp. 303–312, "Partitioned Register File for TTAs" by Johan Janssen and Henk Corporaal.

IEEE Proceedings of the 29th Annual Simulation Symposium, 1996, pp. 221–232, "Architectural Simulation System for M.f.a.s.t." by C.H.L. Moller and G.G. Pechanek.

Computer Architecture News, vol. 18, No. 4, pp. 35–51, Dec. 1990, "The Effect of Employing Advanced Branching Mechanisms in Supescalar Processors" by Yen–Jen Oyang et al.

Proceedings of the 1995 International Conference on Parallel Processing, Aug. 1995, pp. 215–218, "Profile–Guided Multi–Heuristic Branch Prediction" by Pohua Chang and Utpal Banerjee.

J. Korean Inst. Telemat. Electron. (South Korea), vol. 30B, No. 11, pp. 11–16, Nov. 1993, entitled "A Software and Hardware Scheme for Reducing the Branch Penalty in Parallel Computers" by Chan Sook Ham et al.

Microprocessing and Microprogramming, vol. 36, No. 5, Oct. 1993, pp. 259–278, entitled "ALU Design and Processor Branch Architecture" by Gordon B. Steven et al.

International Journal of Parallel Programming, vol. 23, No. 3, Jun. 1995, pp. 221–243, entitled "Enhancing Instruction Scheduling With a Block–Structured ISA" by Stephen Melvin et al.

Technical Report of IEICE, VLD96–77, CPSY96–89 (Dec. 1996), pp. 95–102, "Program Optimization on Instruction Cache at Runtime" by Toshitaka Miura and Yoichi Muraoka.

Technical Report, School of Science and Engineering, Waseda University, CPSY90–53, pp. 91–96, "A Fine Grained Parallel Architecture for Effective Execution of Conditional Structure" by Eishun Suzuki et al.

| #BC | 0 | 1 | 2 | 3 | 4 | 5 | 6 | 7 |
|---|---|---|---|---|---|---|---|---|
| 1 | BP0 | RR4 | RR5 | RR1 | RS0 | RS4 | RS5 | RS1 |
| 2 | BP0 | BP1 | BP2 | RR1 | RS0 | RS4 | RS5 | RS1 |
| 3 | BP0 | BP1 | BP2 | BP3 | RS0 | RS4 | RS5 | RS1 |

FIGURE 8A

| #BC | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | BP0 | RR4 | RR5 | RR1 | RS0 | RS4 | RS5 | RS1 | RR2 | RR6 | RR7 | RR3 | RS2 | RS6 | RS7 | RS3 |
| 2 | BP0 | BP1 | BP2 | RR1 | RS0 | RS4 | RS5 | RS1 | RR2 | RR6 | RR7 | RR3 | RS2 | RS6 | RS7 | RS3 |
| 3 | BP0 | BP1 | BP2 | BP3 | RS0 | RS4 | RS5 | RS1 | RR2 | RR6 | RR7 | RR3 | RS2 | RS6 | RS7 | RS3 |
| 4 | BP0 | BP1 | BP2 | BP3 | BP4 | RS4 | RS5 | RS1 | RR2 | RR6 | RR7 | RR3 | RS2 | RS6 | RS7 | RS3 |
| 5 | BP0 | BP1 | BP2 | BP3 | BP4 | BP5 | RS5 | RS1 | RR2 | RR6 | RR7 | RR3 | RS2 | RS6 | RS7 | RS3 |
| 6 | BP0 | BP1 | BP2 | BP3 | BP4 | BP5 | BP6 | RS1 | RR2 | RR6 | RR7 | RR3 | RS2 | RS6 | RS7 | RS3 |

FIGURE 8B

METHOD AND APPARATUS TO SELECT THE NEXT INSTRUCTION IN A SUPERSCALAR OR A VERY LONG INSTRUCTION WORD COMPUTER HAVING N-WAY BRANCHING

This application is related to following co-pending applications: U.S. Pat. No. 5,805,850, filed Jan. 30, 1997 entitled Very Long Instruction Word (VLIW) Computer Having Efficient Instruction Code Format; U.S. Pat. No. 5,793,944, filed Sep. 13, 1996 entitled System for Restoring Register Data in a Pipelined Data Processing System Using Register File Save/Restore Mechanism; U.S. Pat. No. 5,875,346 filed Sep. 13, 1996 entitled System For Restoring Register Data in a Pipelined Data Processing System Using Latch Feedback Assemblies; U.S. Pat. No. 5,924,117, filed Dec. 16, 1996 entitled Multiported and Interleaved Cache Memory; U.S. Pat. No. 5,890,009, filed Dec. 12, 1996 entitled VLIW Architecture and Method for Expanding a Parcel. All of the above applications are assigned to the assignee herein and all of the above applications are herein incorporated by reference.

BACKGROUND OF THE INVENTION

The fundamental structure of a modern computer includes peripheral devices to communicate information to and from the outside world; such peripheral devices may be keyboards, monitors, tape drives, communication lines coupled to a network, etc. Within the computer is the hardware necessary to receive, process, and deliver this information to and from the outside world, including busses, memory units, input/output (I/O) controllers, storage devices, and at least one central processing unit (CPU). The CPU and other processors execute instructions of computer application programs and direct the operation of all other system components. Processors actually perform primitive operations, such as logical comparisons, arithmetic, and movement of data from one location to another, quickly. What may be perceived by the user as a new or improved capability of a computer system may actually be the processor(s) performing these same simple operations much faster. Continuing improvements to computer systems, therefore, require that these systems be made even faster.

One measurement of the overall speed of a computer system, also called the "throughput", is measured as the number of operations a processor performs per unit of time. Conceptually, the simplest of all possible improvements to system speed is to increase the clock speeds of the various components, particularly the clock speed of the processor. If everything runs twice as fast but otherwise works in exactly the same manner, the system then performs a given task in half the time. Computer processors, which were constructed from discrete components years ago, performed significantly faster by shrinking the size and reducing the number of components so that eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by various other techniques. Designers, however, know that physical size reductions cannot continue indefinitely, and there are limits to continually increasing processor clock speeds. Attention has therefore been directed to other approaches, including new computer architectures, for further improvements in overall speed of the computer system.

The modest cost of packaging individual processors on integrated circuit chips has it practicable to improve system speed using multiple processors without changing the clock speed. In addition, the system speed significantly improves by off-loading work from the CPU to the slave processors having limited functions. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can simultaneously execute a different task on behalf of a different user to increase the overall speed of the system. This technique, shown in FIG. 1, illustrates several processors labeled CPU 1, CPU 2, . . . connected by a communications network and controlled so that more than one processor may execute different tasks at the same time. Each short horizontal line under a task represents an instruction, with many instructions per task. In a real situation there probably would be many more instructions per task than shown in FIG. 1. Each CPU executes one instruction at a time so with more than one CPU executing instructions simultaneously, the parallel processor saves elapsed time. There is significant overhead, however, to start all the separate tasks in separate processors, to synchronize and communicate among tasks and to assemble their partial results to generate the overall result. To use this kind of traditional parallel processor on a particular application, a programmer or a sophisticated compiler must break the problem into pieces and set up appropriate communications and controls. If this overhead consumes more time than was saved by parallel execution, the parallel processor approach is limited. This traditional parallelism offers most cycle savings to problems which divide naturally into large pieces which have little need to communicate with each other, such as scientific numerical methods and other highly structured problems. Practicably, however, there is limited application for parallel processing on multiple CPUs for problems which have unpredictable pathways of execution and/or which require extensive sharing and communication among the processors.

Computer architectures of the reduced instruction-set computers (RISC), superscalars, and very long instruction word (VLIW) machines are based on the premise that the simpler the instruction set, the more efficiently it can be implemented by hardware. These architectures have multiple execution units and multiway branching mechanisms for parallel processing of application code. These architectures, moreover, stimulated the development of compiler technology to take advantage of the parallelism available in an application without resorting to special languages that express this parallelism in a highly optimized code. During the compilation process as many decisions as possible are made to free the hardware from making decisions during program execution.

Another approach is a hybrid in which a single CPU has characteristics of both a uniprocessor and a parallel machine to implement fine-grained parallelism. In this approach, a single instruction register and instruction sequence unit execute programs under a single flow of control, but multiple arithmetic/logic units (ALUs) within the CPU can perform multiple primitive operations simultaneously. Rather than relying on hardware to determine which operations can executed simultaneously, a compiler formats the instructions to specify the parallel operations before execution. The superscalar computer which typically executes up to four instructions per processor clock cycle. In addition, extending the instruction word held in the instruction register to specify multiple independent operations to be performed by the different ALUs requires a very long instruction word. The Very Long Instruction Word (VLIW) computer may execute sixteen instructions or more per processor cycle.

Several academic papers suggest that a VLIW architecture can achieve greater parallelism and greater speed than multiple independent processors operating in parallel in many applications. Shown in FIG. 2 is a model of an exemplary VLIW computer having fine-grained parallelism at the level of machine instructions within a task. As can be seen, a typical application program has a single flow of control indicated by the time line along the left of the figure, but primitive operations within that flow are performed in parallel. The VLIW compiler discovers the primitive operations within a program can be performed simultaneously and then compiles the instructions for these operations into a compound instruction, the very long instruction word, hence the vernacular for the computer architecture and for the instruction: VLIW. An automated compiler for a VLIW machine, therefore, does not have to alter program flow which is something that has been almost impossible to automate in parallel processor machines; the compiler for a VLIW machine has only to determine which primitive operations can be performed in parallel and create the compound instructions executed by the hardware. A well-written compiler, moreover, generates an instruction stream to optimize the useful work of separate hardware units during as many machine clock cycles as possible. A primitive is that portion of a VLIW instruction which controls a separate hardware unit. These separate hardware units within the CPU include arithmetic logic units (ALU), including floating point units which perform exponential arithmetic, register to storage (RS) units which provides a direct path to memory storage outside the CPU, and register to register (RR) units which provides a direct path to another register in the processor. Thus in one cycle, all these separate resources within a VLIW machine can be used, so several basic machine instructions can execute simultaneously. The advantage is that a task can be completed in fewer machine cycles than is possible on a traditional uniprocessor, in other words, the "turnaround time" from task initiation to task completion is reduced and its results are available sooner. For transaction processing applications, where each transaction requires a long sequential series of operations, and communication between transaction processing tasks is negligible, this idea has a natural advantage over traditional parallelism.

The size and format of the VLIW present special considerations. The expected size of the instruction word imposes significant burdens on the supporting hardware outside the CPU, such as memory, instruction cache, buses, etc. There are several reasons for the large instruction word in the VLIW design. Recall that a VLIW requires that multiple hardware units operate simultaneously to perform parallel operations. Each of these hardware units requires its own command, which includes an operation code, source and destination designations, etc. Further there must be a mechanism to determine the next instruction to execute. This determination, often called control flow, presents its own peculiarities in any computer but these peculiarities greatly increase in a VLIW computer. Control flow is said to jump to the next instruction when there is no choice or condition which determines the next instruction. Control flow branches to the next instruction when the change of control flow is conditional. By far, conditional branching constitutes the dominant mechanism to change control flow in most computer architectures, including VLIW.

In order to utilize the conditional branching capabilities, the compiler resolves all conditional branch statements into two component parts: instruction(s) which perform a test and set of a condition register; and a branch instruction which tests a condition register previously set. Without violating dependency relationships, the compiler schedules the instructions which test and set the condition registers to their earliest possible execution times. When condition registers that determine a possible path through a branch tree have been set, the compiler may then form a branch conditional instruction in the VLIW testing up to sixteen condition registers. The compiler then schedules as many instructions as possible that lie along the branch path into this VLIW. The above step is repeated until non-dependent instructions on up to any number, preferably six or eight, branch paths plus a sequential path are formed into a single VLIW.

Evaluating the conditions to determine the appropriate branch is traditionally accomplished in a few ways. The first method uses special bits in the executing instruction, called a condition code which can be implicitly or explicitly set. Implicitly set condition codes increase the difficulty of finding when a branch has been decided and the difficulty of scheduling branch delays. This makes it hard to find instructions that can be scheduled between the condition evaluation and the branch, especially when the condition code is set by a large or haphazardly chosen subset of instructions. Many new architectures avoid condition codes or set them explicitly under the control of a bit in the instruction.

Another technique to test branch conditions involves simple equality or inequality tests, e.g., (a) if the result of adding A+B is greater than or equal to zero, then go to C; or (b) if the result of a logical instruction is equal/not equal to TRUE/FALSE, go to D, see e.g., FIG. 10 and its accompanying discussion. Usually simple compare and branch instructions are part of the branch, but for more complex comparisons, such as floating-point comparisons, a condition register may be implemented wherein the result of the comparison is tested with a value stored in a register and a branch is specified depending upon the comparison. In any event, determining the next instruction by evaluating branch conditions is not a trivial undertaking. The problems are compounded n-fold in a VLIW because there may be n branch conditions needed to be evaluated to determine the next VLIW.

Typical operating systems and other types of code have a program structure characterized by sequences of a few instructions separated by branches. For processors with multiple parallel execution units, such as VLIW, the capacity for a compiler to fill the available execution units by manipulating the code is severely restricted if only one branch can be made per VLIW instruction cycle. The problem is to minimize the impact of complex branching structures not only on a compiler's capacity for optimizing code movement, but also on the critical path and cycle time of the VLIW processor hardware. An N-way VLIW or superscalar processor where N is the number of branches and is large, i.e., greater than or equal to sixteen, faces the problem of very likely having to branch almost every cycle with up to eight-way branching possible and three- to four-way branching probable. If the access time to critical registers and caches for instructions and data within the processor complex is taken to be approximately the cycle time plus clock and latch overhead of a superscalar or a VLIW processor, then all current reduced instruction set computer (RISC) architectures already require two cycles latency per branch taken. At two cycles per iteration for resolving and fetching branches, the effective execution rate of the processor is reduced to one-half of what it would have been without branches. An extra cycle or two for missed prediction of branches, moreover, might be common and average branch taken latency could approach three cycles. This is an unacceptable penalty. To further compound the problem of branch prediction in a VLIW machine, a requirement to predict eight simultaneous branches with a total accuracy of ninety-five percent is an impossible task. Hypothetically, in a sixteen-way parallel processor with eight possible branch targets, either an eight-port instruction cache must be implemented which is very expensive, or some type of branch prediction scheme must be used.

As said before, the power of a VLIW machine is to evaluate which primitives can be executed in parallel and then execute all primitives in parallel and then select the next VLIW for future processing. It is, therefore, necessary to permit conditional branching to multiple destinations from a single VLIW, a characteristic refereed to as N-way branching. All of the branch conditions and destinations, moreover, must be specified in the instruction.

Joseph Fisher and his group at Yale observed that branches in a particular program follow a predictable path a high percentage of the time. Fisher et al. formulated the Extra Long Instruction (ELI), and measured the most common execution paths and designed branching mechanisms to determine if these paths could be executed simultaneously. The trace scheduling techniques Mr. Fisher created, disclosed in U.S. Pat. No. 4,833,599 entitled "Hierarchical Priority Branch Handling for Parallel Execution in a Parallel Processor" to Colwell et al., and Multiflow Corporations's VLIW processor require compile time prediction of the most probable path through a program branch tree. For scientific computing having a high degree of predictability, this approach works reasonably well. If, however, the code would deviate from a predictable path, a high penalty would be paid. Other code structures, such as in commercial applications and operating systems, do not have predictable branching so the trace scheduling techniques disclosed by Fisher leads to poor utilization of the available parallel resources in the VLIW unit.

Percolation scheduling is another technique to be used for commercial and operating systems where many branches are simultaneously executed. Kemal Ebcioğlu created this system where there is no prediction for branch path. FIG. 3 illustrates how percolation moves instructions up in the instruction stream so they are executed as soon as their data are available. The dotted arrows in FIG. 3 show movements of instructions from positions in an original stream of von Neumann execution to final positions as parcels in VLIW instructions. One instruction 300 has been moved above a conditional branch 320; in its original position in the instruction stream the execution of instruction 300 is dependent on the result of a conditional branch 320, but in the resulting VLIW instruction stream, instruction 300 will be executed before the branch condition is tested. This is an example of speculative execution which means that the work is done before it is known whether or not the work is necessary. When a VLIW machine has enough resources to accomplish this speculative work without holding up any other work, then there is a gain whenever the speculative work is later determined to be necessary. With more and more resources, speculative execution becomes more and more powerful. For example, if a program splits into two legs after a conditional branch and there are enough resources to move some instructions from both legs up above the branch point, then speculative execution definitely reduces the time needed to finish this program. See Silberman, Gabriel M. and Ebcioğlu, *An Architectural Framework for Supporting Heterogeneous Instruction-Set Architectures,* IEEE COMPUTER 39–56 (June 1993).

SUMMARY OF THE INVENTION

It is thus an object of the invention to provide a high frequency, large, and single cycle instruction cache which delivers VLIW instructions to a VLIW processor. Normally, in cache design, these requirements are contradictory. The instruction cache has a frequency preferably less than one nanosecond, is large and in a single cycle provides wide parallel access. The feature of the invention to satisfy this object is a large sixty-four kilobyte instruction cache physically divided into blocks of four kilobytes each called a mini-Icache. The mini-Icache design of the four-kilobyte block allows each mini-Icache to be nearly autonomous of another mini-Icache; thus very few wires are required and the design is much simplified. Thus, the instruction cache is insensitive to scaling delay.

It is yet another object of the invention to permit evaluation of N-way branching of all branches in a VLIW instruction by fetching all possible multiple paths branches of an executing VLIW instruction from the instruction cache using a fast inexpensive one-port design. The feature of the invention which permit this object is that all target VLIW instructions, other than the next sequential VLIW instruction, of a VLIW instruction are located in the same one-kilobyte block of the instruction cache. And, for most circumstances, that boundary of the one-kilobyte block is not crossed. Allowing the sequential control flow, however, to cross the one-kilobyte boundary eases the constraint on the compiler wherein the invention may be described as (N+1)-way branching.

It is yet another object of the invention to provide a scalable and a regular instruction cache for processing of VLIW instructions. The features of the inventions which permit scalability is the use of physical parcels in the instructions and correspondingly, in the instruction cache. Thus any width of the VLIW instruction can be accommodated. By allowing one physical parcel of a VLIW instruction in a mini-Icache, the mini-Icaches are independent and by adding more physical parcels, the designer can add width and increase the size of the instruction cache. The instruction cache is also regular in that it is statistically and physically intact. The arrangement of the physical parcels having all branch conditions and target addresses contained therein, into mini-Icaches comprise the building blocks of the instruction cache. Increasing the number of physical parcels and/or increasing the size of the physical parcels does not create new problems for a instruction words having four, five, eight, sixteen, seventeen, or any number including thirty-two, or even sixty-four parcels.

It is yet another object of the invention to increase the efficiency of a computer for adding only marginal computer expense and overhead for evaluating the branch conditions to determine and computing the address of the next VLIW instruction. The extra bits and computing required to determine the next address, the condition codes, and the branch conditions have been amortized by placing them into replicated physical parcels and then evaluating all conditional branches simultaneously. Thus, existing registers need only increase minimally in size to accommodate the VLIW instruction. A further advantage of simultaneous evaluation of all conditional branches is that the invention avoids the expensive penalty of having to back out of incorrect branch prediction.

Rather than requiring a predictable branch path to be known at compile time, this invention simply prepares for the simultaneous execution of all possible paths completely until the branch path is known. Multiple simultaneous speculative evaluation of the conditional branches contained within a single instruction results in efficient and high use of the parallel execution units. The result is better overall performance for superscalar and VLIW processing.

Thus, one aspect of the invention is a method of digital computing by, first, replicating all target addresses including each offset associated with a branch parcel, and all branch conditions contained within all branch parcels of an instruction having multiple parcels. Some of the parcels are branch parcels and some parcels are operational parcels, in any event, however, all parcels are capable of independent execution in a processor. The method further comprises loading the instruction with the parcels with the replicated target addresses and branch conditions into an instruction cache and then selecting the instruction for execution. Simultaneously, the following three events occur: (1) the operational parcels are executed in a plurality of execution units of the processor, each execution unit dedicated to a respective each one of the parcels; (2) all branch conditions of all branch parcels of the instruction are evaluated against a plurality of condition code registers to determine a control flow branch taken; and (3) all replicated offsets target addresses of the instruction are decoded with logic circuits. The evaluated branch conditions of the control flow branch taken are correlated to the decoded target addresses and to the execution results of the operational parcels. The execution results of the control flow branch taken are stored in memory and the condition codes resulting from the execution results are stored in condition code registers to be evaluated against the branch conditions of the selected instruction.

The invention is also a method of computing by compiling up to N primitive computer operations that can be executed in parallel into a first instruction; the first instruction comprising at least N parcels, some of which are branch parcels having target addresses and branch conditions to be evaluated to determine a second instruction and some of which are operational parcels for execution in a computer processor. All target addresses and all branch conditions of N parcels of the first instruction are replicated N times for storage in an instruction cache. All possible subsequent instructions indicated by all target addresses in all branch parcels of the first instruction are stored in a specified section of an instruction cache identified by a next address and each possible subsequent instruction is individually addressed by an offset. Inside the instruction cache, each one of the N parcels having the replicated target addresses and branch conditions are aligned into each one of a plurality of mini-caches in the instruction cache. Again three concurrent events occur in this method: (1) all branch conditions of the first instruction are evaluated N times simultaneously to determine which of all possible subsequent instructions will be the second instruction; (2) all offsets of the first instruction are decoded N times to select the target address of the second instruction; and (3) all operational parcels of the first instruction are executed to determine at least one condition code for the second instruction and the arithmetic and logical results of the operational parcels are stored in various memories. The target address of the second instruction is forwarded to the instruction cache to load the second instruction into an instruction register for its execution. At least one condition code resulting from execution of the first instruction is sent to condition code registers to be applied to the branch conditions of the second instruction.

The invention is also a computer processor which has an instruction cache capable of delivering an instruction to the instruction register, the instruction cache has columns aligned into N minicaches and rows of parcels, each of the parcels being physically located in one of the N minicaches. Any number of parcels, each of which have a primitive computer operation that can be executed in parallel, can comprise an instruction. The computer processor also has N target address select circuits, each directly connected to a respective one of the N minicaches, to decode up to N target addresses to select the instruction to deliver to the instruction register. The instruction register has L branch parcels where L is less than or equal to N, each of L branch parcels having L target addresses for subsequent instructions, and L branch conditions, and the instruction register further having M operational parcels. All target addresses of the L branch parcels comprise a next address and L offset addresses. The computer processor also has N execution units, at least one of the N execution units operationally connected to a respective one of M operational parcels to execute the operational parcels. Offset address decode logic is operationally connected to the N select circuits to decode all target addresses in each of the L branch parcels. Condition code registers are operationally connected to the instruction register to evaluate each of the L branch parcels and then communicate with the N target address select circuits to select the next instruction.

In the computer processor, the instruction cache is further arranged into blocks wherein next address indicates a particular block in which all subsequent instructions indicated by all target addresses are stored and each of the L offset addresses indicates an individual instruction in the block. An instruction may occupy an entire row of the instruction cache wherein one parcel is physically located one minicache and (L+M)=N; an instruction, however, may also occupy less than an entire row of the instruction cache wherein one parcel is physically located one in each minicache wherein (L+M)<N. Alternatively, an instruction may occupy more than one row of the instruction cache with one parcel physically located in each one mini-cache and (L+M)>N. The computer processor and the instruction cache is intended to accommodate cases where various sizes of instructions may be stored in the instruction cache at any one time.

The invention is also a data processing system, having a central processing unit comprising a processor capable of executing an instruction having multiple parcels each of which can be executed in parallel. The central processing unit also has an instruction cache divided into mini-Icaches, each of which correspond to a parcel in the instruction. The central processing unit also has a branch condition evaluation logic unit connected to at least one condition code registers and an offset decode logic unit. These units are connected to a late select unit which is also functionally connected to an instruction register. The central processing unit also has a plurality of execution units, a plurality of registers including the at least one condition code register and a multi-port register, a plurality of cache memories, a main memory; wherein the execution units, the logic and late select units, the registers, the memories, the instruction register, and the instruction cache are functionally interconnected. The data processing system also comprises a plurality of external connections comprising a bus interface, a bus, at least one input/output processor connected to at least one of the following: a tape drive, a data storage device, a computer network, a fiber optics communication, a workstation, a peripheral device, an information network; any of which are capable of transmitting data and instructions to the central processing unit over the bus. In the data processing system, the selection of a next instruction is accomplished by the replication of all branch conditions, a next address, which may be a virtual address, and all offset addresses of possible next instructions resulting from the execution and evaluation of the instruction and storage of all replicated information into the instruction cache. All possible next instructions are loaded into the instruction cache in a block specified by the next address. The branch condition evaluation unit in conjunction with the condition code registers of the central processing unit evaluates all branch conditions and the offset decode logic unit decodes all offset addresses of the instruction. These decoded addresses are sent to the late select unit connected to the instruction register which selects the next address for the instruction register. Only those results of the branch which has been evaluated to be the correct branch determines the next instruction and only those execution results of that branch are saved to at least one of the registers and/or memories and/or forwarded to at least one of the external connections.

Quite simply, the invention is a method of computer processing wherein all branch information of an instruction to be executed in a processor is replicated and then aligned into an instruction cache into N mini-caches, wherein each mini-cache contains all the replicated branch information. All branch information is evaluated simultaneously to determine the next instruction to be executed in the processor.

The invention is an apparatus for computer processing, comprising means to replicate all branch parcels in an instruction having at least one branch parcel and at least one operational parcel which can be executed in parallel; means to store the instruction with the replicated branch parcels in an instruction cache such that one each of the replicated parcels and one each of the operational parcels are stored in one each mini-Icache; means to store all possible next instructions in a same block in the instruction cache; means to select the instruction into an instruction register; means to evaluate all branch conditions in all branch parcels of the instruction simultaneously in all mini-Icaches; means to decode all addresses of all possible next instructions of the instruction simultaneously in all mini-Icaches concurrently functioning with the evaluating means; and means to execute all operational parcels of the instruction concurrently with the evaluating means and decoding means; means to correlate results of the evaluating means to the decoding means to the execution means; and means to select the next instruction from the instruction cache to the instruction register.

While the invention has been summarized and the need for the invention has been discussed, the invention itself may best be understood with reference to the following figures of the Drawing and the accompanying description.

DESCRIPTION OF THE DRAWING

FIGS. 8*a* and 8*b* are examples of VLIW instructions having eight parcels and sixteen parcels, respectively.

DESCRIPTION OF THE INVENTION

Figure 1:
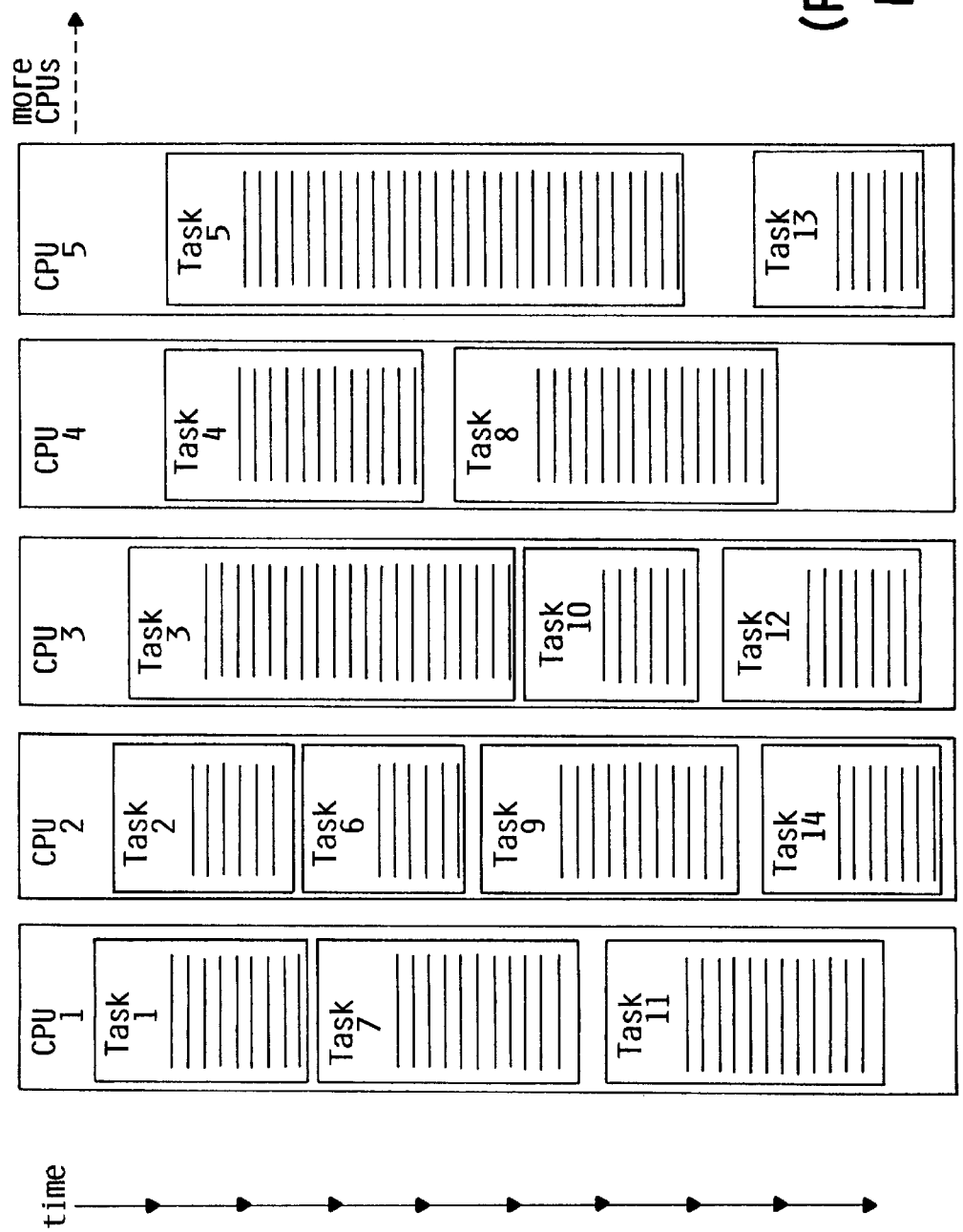
FIG. 1 is a representation of multiple processors executing sequential lines of code in parallel.
Figure 2:
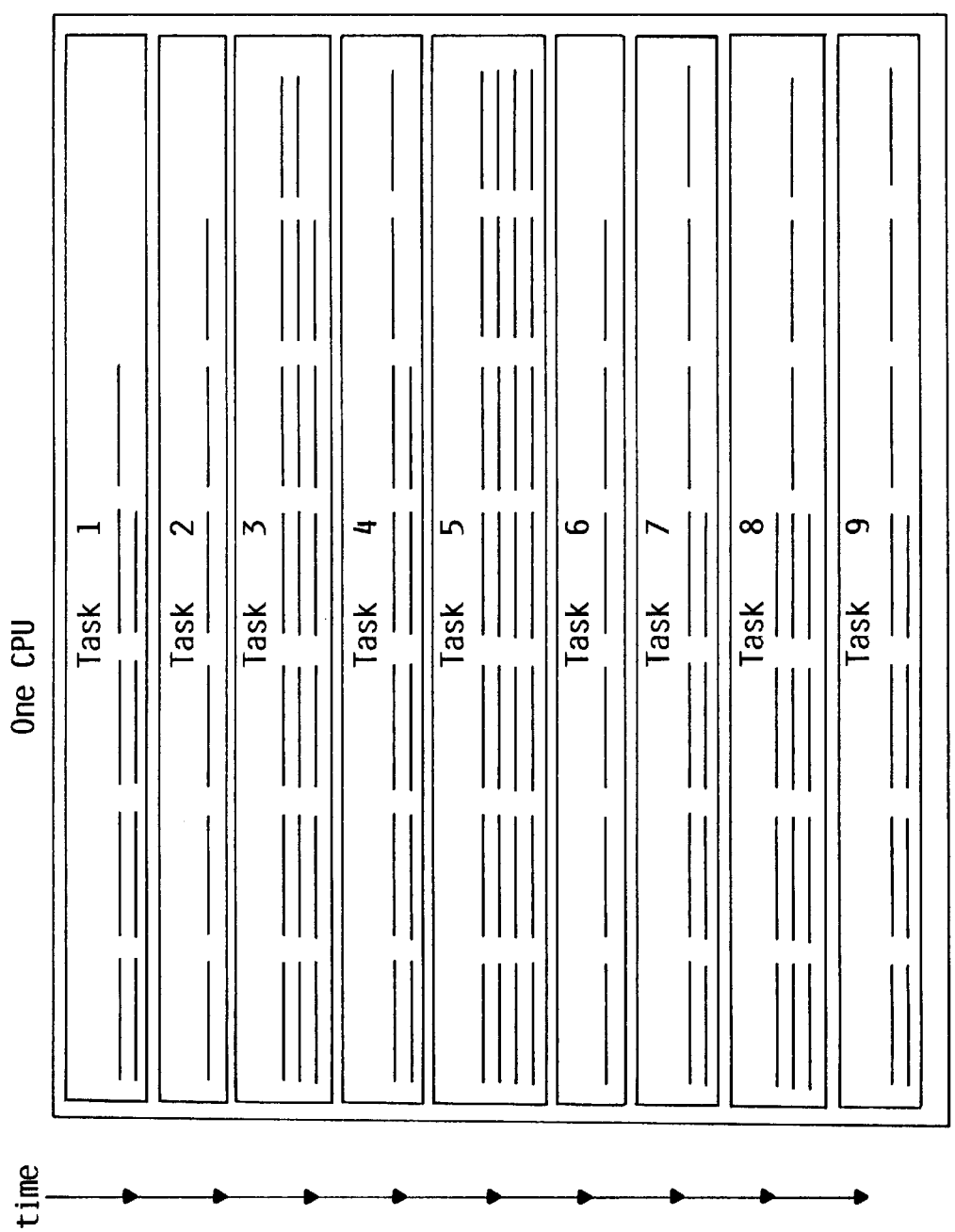
FIG. 2 is a representation of a single processor executing multiple lines of code in parallel; the concept of the VLIW computer.
Figure 3:
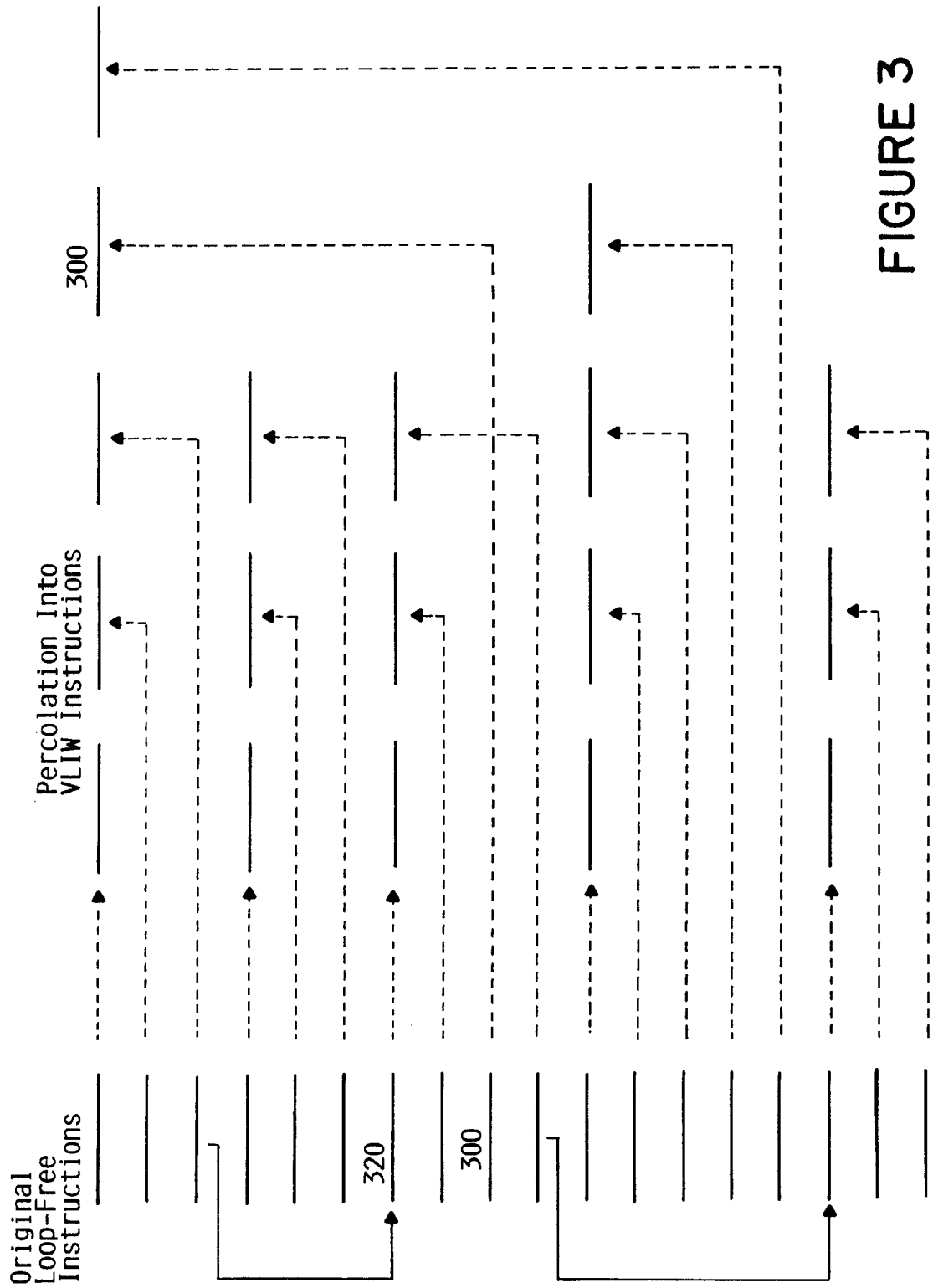
FIG. 3 is an illustration of VLIW instructions that have been compiled by a VLIW computer.
Figure 4:
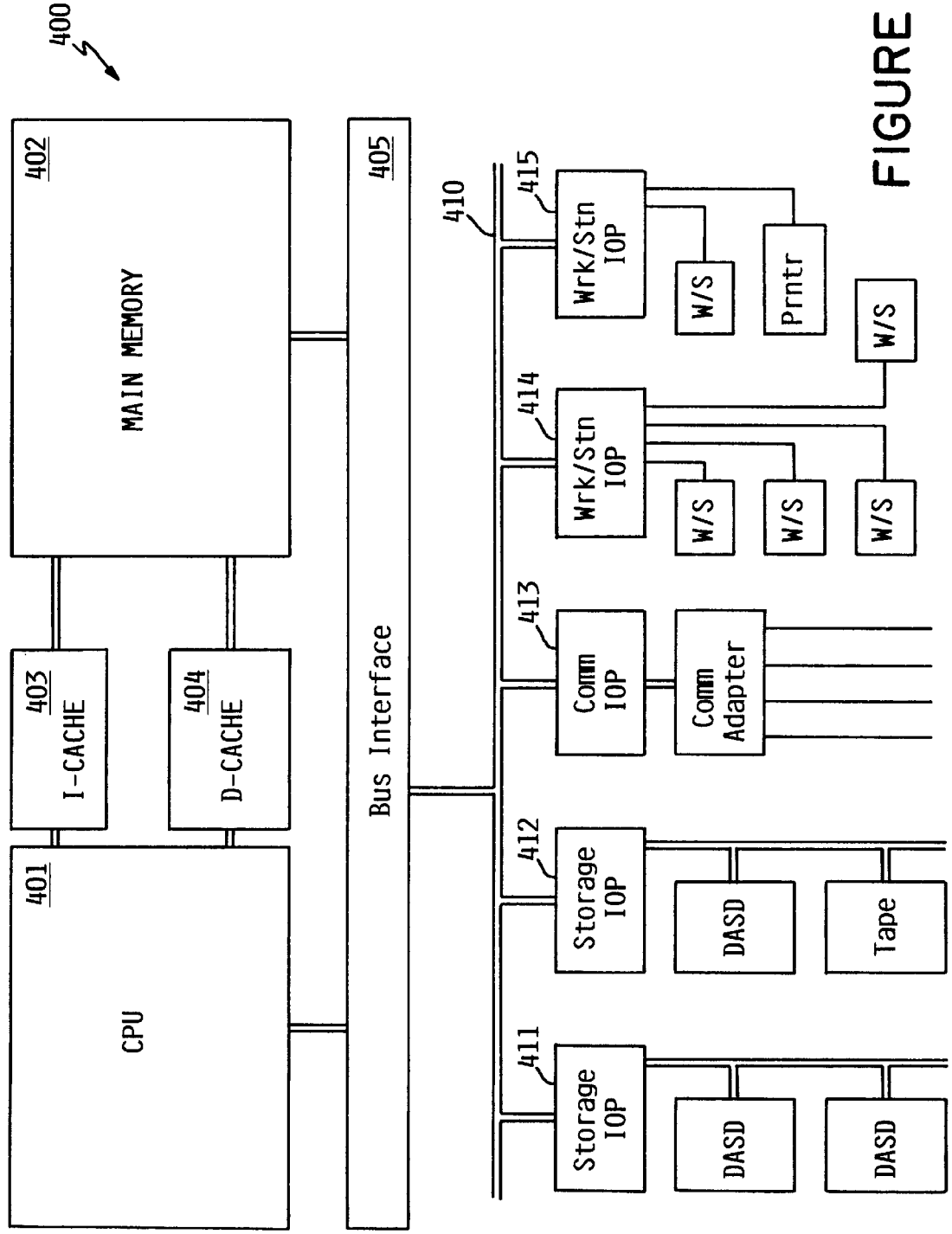
FIG. 4 is a high level computer system to implement the branching capability of the VLIW computer.

The major hardware components of the a computer system 400 for utilizing a VLIW processor architecture according to the preferred embodiment of the present invention are shown in FIG. 4. CPU 401 for processing instructions is coupled to separate caches 403 and 404. The caches are high speed memories which store information frequently and most recently used by CPU 401. As represented here, the instruction cache and the data cache are actually a hierarchy of caches. A level one cache (L1 cache) is fastest and closest to the CPU and a level two cache (L2 cache) is slower and farther from the CPU than a level one cache, but is still substantially faster and closer to the CPU than main memory 402; there may be a cache intermediate between the level one cache and the processor or between the level one and level two caches or between the level two cache and memory. There are multiple levels of both data and instruction caches (D-caches and I-caches) and the invention and description of cache herein is intended to include this hierarchy of caches. Instruction cache (I-cache) 403 stores instructions for execution by CPU 401. Data cache (D-cache) 404 stores data to be used by CPU 401. Both caches communicate with random access main memory 402 in which both instructions and data reside. The architecture, by incorporating separate caches as above, provides the bandwidth for both instructions and data required for successful execution in a VLIW or a superscalar machine. CPU 401 and main memory 402 also communicate via bus interface 405 with system bus 410. Various input/output (I/O) processing units (IOPs) 411–415 attach to system bus 410 and support communication with a variety of storage and I/O devices, such as direct access storage devices (DASD), tape dives, workstations, printers, and remote communication lines. It should be understood that FIG. 4 is intended to depict the representative major components of a system 400 at a high level, and that the number and types of such components may vary.

VLIW, as the name implies, have an unusually long computer instruction, on the order of 500–1000 bits or more. A VLIW is comprised of multiple parcels each associated with an operation which can be executed simultaneously. Hardware to execute these operations is dedicated to each of these parcels; so there is a processing unit, such as an arithmetic logic unit, a floating point unit, a register/register unit, or a register/store unit associated with each individual parcel. A feature of VLIW processing is that all operations in a single word proceed in parallel without requiring special hardware for detecting instruction-dependency violations or resource conflicts. The compiler performs all these checks before it generates the instructions, thus allowing parallel execution of all operations in each long instruction. Each of the parcels will be executed in parallel and a number of branch instructions and a sequential path wherein no branch conditions are true will be executed in a single cycle.

Figure 5:
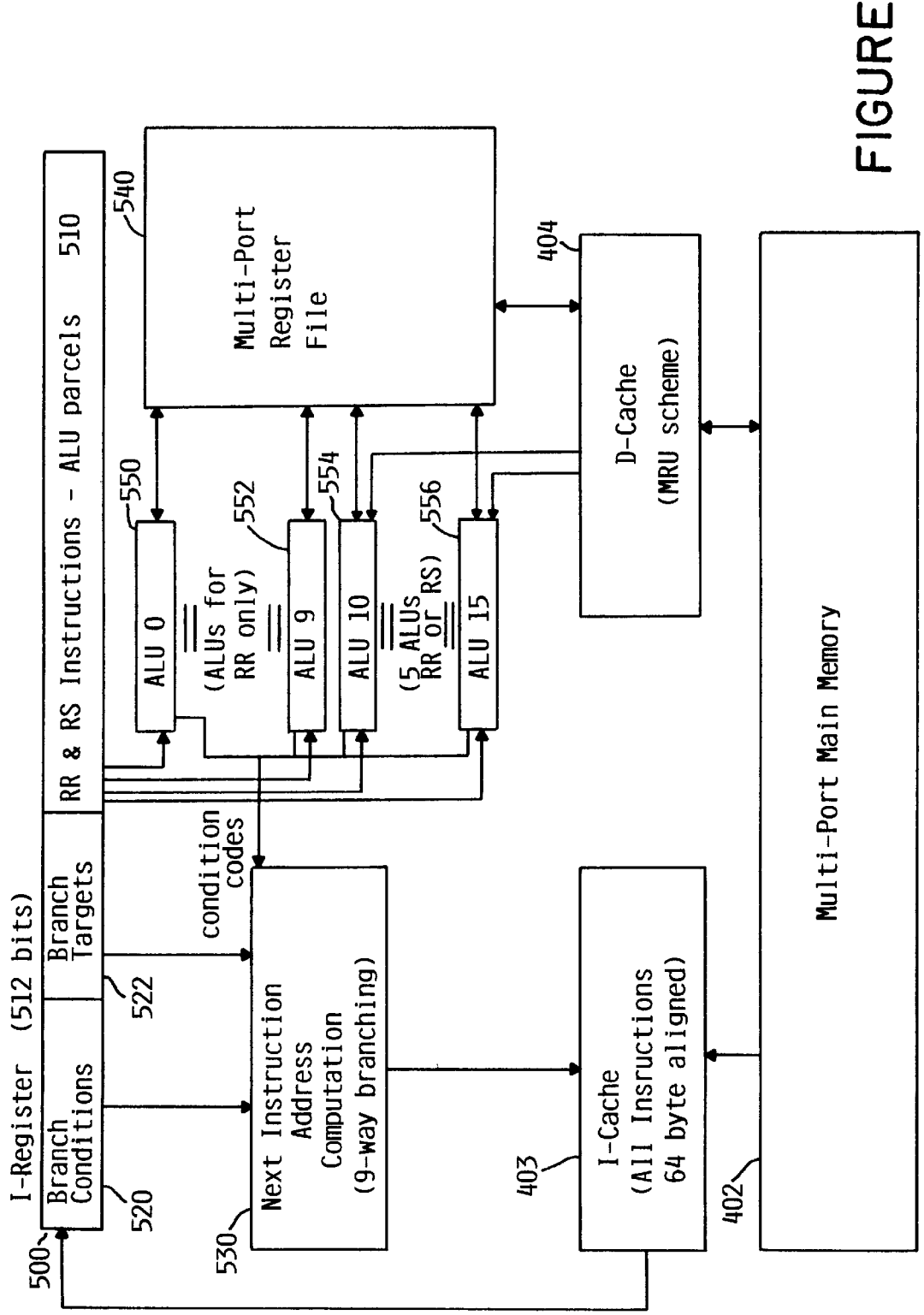
FIG. 5 illustrates components of the VLIW processor which implements the branching capability of the invention.

A simplified block diagram of a VLIW machine is shown in FIG. 5. The VLIW instruction becomes an integral part of the hardware when it is loaded into the instruction register 500 from the I-cache, shown as 403 in FIG. 4. This instruction register 500 must be large enough to take a full VLIW instruction each cycle because the entire instruction is needed to control the hardware for one cycle. The instruction register 500 contains a number of parcels 510, each of which is equivalent to one elementary operation or primitive, as refereed to in the Background of the Invention. When loaded into the instruction register 500, each parcel 510 occupies specific bit positions and controls those hardware units hard-wired to those positions. If an instruction does not contain the maximum number of parcels because of the compiler's inability to find sufficient parallelism for that point in the program, then the unused bit positions are reset appropriately. The instruction also includes branch conditions 520 which are the values against which the condition code registers are to be compared. Each branch target 522 of the VLIW in instruction register 500 contains the next address of the target VLIW instruction to be loaded into the instruction register 500 next if the condition codes match the branch conditions 520.

Each ALU parcel 510 provides an instruction to one ALU 550, 552, 554, 556. Suppose, for example, one ALU parcel contains an ADD instruction; this same parcel contains information so the ALU can find the operands to be added, perhaps in the branch target data 522 in the instruction register 500 itself, but more generally the operands are in the multi-port register file 540. The multi-port register file 540 is a set of general purpose registers available to all ALUs and can be, for example, the Multiported and Interleaved Cache Memory described in Ser. No. 764,004, incorporated by reference. In fact, a register in the multi-port register file 540 is often used by more than one ALU in the same cycle and each ALU can access more than one register in the multi-port register file 540 in the same cycle. Thus, the "multi-port" capability of the register file 540 is critical to the VLIW machine.

The multi-port register file 540 is used for temporary storage of data taken from or going to data cache 404 by a LOAD instruction. The LOAD instruction is usually executed before using those data in succeeding ALU operations and then the results of the ALU operation are immediately placed in the multi-port register file 540. STORE instructions move data from the multi-port register file 540 into the larger main storage 402 with copies provided to the data cache(s) 404.

Each ALU 550, 552, 554, 556 can produce one condition code on each cycle. These condition codes are forwarded to the next address generator 530 for use on the next cycle where they are compared against the branch conditions 520 of the executing VLIW instruction to determine the next VLIW instruction to be loaded into the instruction register 500. The next address generator 530 also uses the condition code settings to determine whether or not ALU results are to be saved at the end of each cycle. Any conditional operation of the form "IF (condition) THEN (perform action)" will be resolved in two cycles; the condition is tested on the first cycle to set a condition code which is then used to control actions on the following cycle. If, for example, the conditional action is R1=R1+R2, where R1 and R2 are values in the multi-port register file 540, the next VLIW instruction contains that parcel and the condition code determines if the register file 540 register R1 is updated at the end of the cycle.

Figure 6:
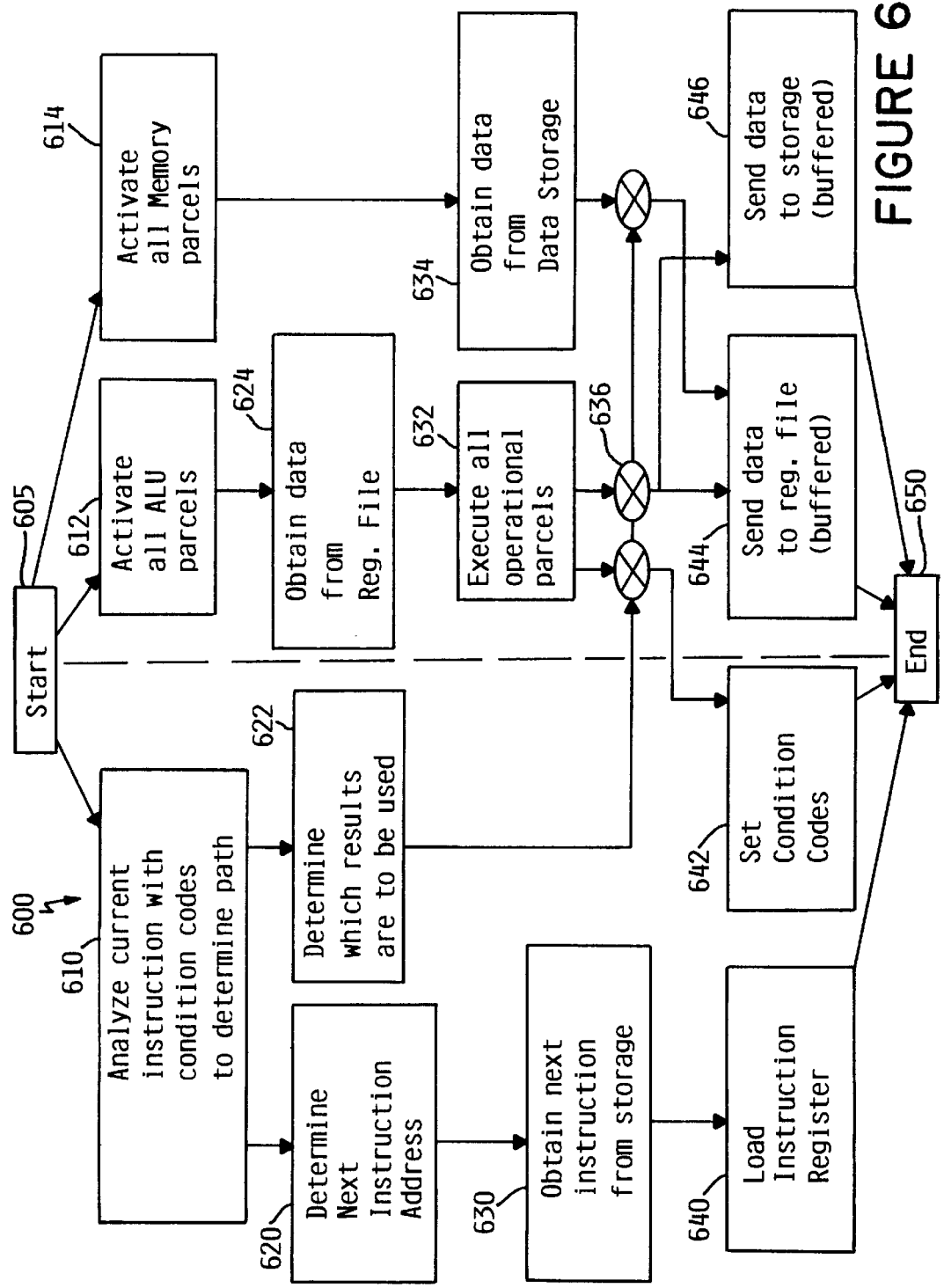
FIG. 6 is a flow chart of the method whereby branching conditions are resolved in parallel with the execution of a VLIW instruction.
Figure 7:
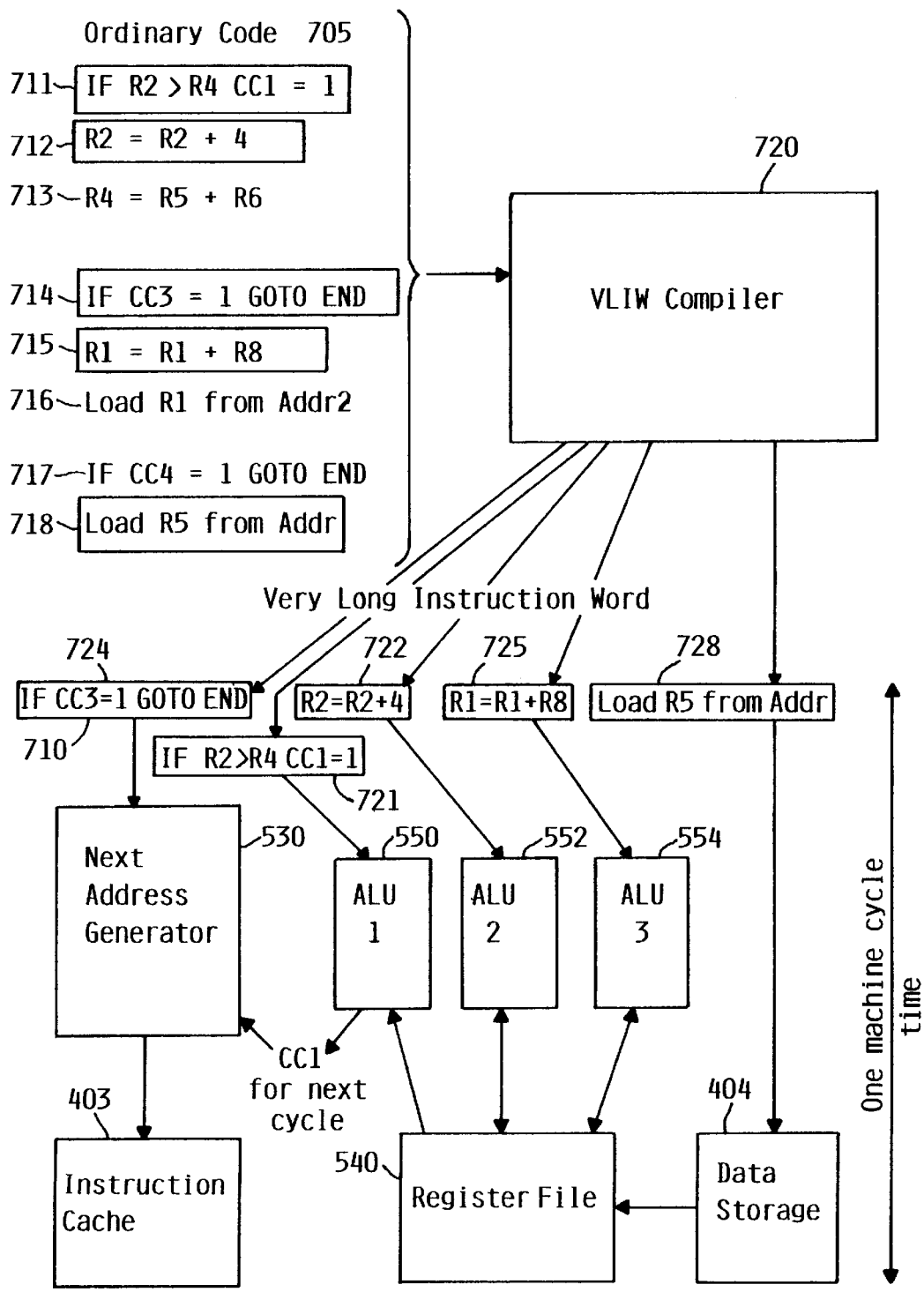
FIG. 7 is a pictorial representation of the execution of a VLIW instruction in a VLIW computer.

The actual execution of one VLIW instruction is shown in FIGS. 6 and 7, and it is suggested that these two figures be read simultaneously. In FIG. 7, a VLIW compiler 720 compiles and percolates certain instructions 711, 712, . . . 718 of ordinary code 705 into a single VLIW instruction 710 that can be executed in parallel. The entire time in which one VLIW instruction 710 is executed is one machine cycle as represented along the vertical wherein the functions that are along the same or nearly the same horizontal dimension occur in parallel in both figures. For instance, in FIG. 6 steps 610, 612, and 614 occur simultaneously. To begin, at step 605, the VLIW instruction 710 having N parcels, which in the example of FIG. 7 is five parcels, is loaded into the instruction register 500. Next, the parcels 722, 723, 714, 715, 718 are activated as in steps 612 and 614 to control execution of the hardware element(s) to which they are "hard-wired." Simultaneously, in step 610, the current settings from the previous machine cycle of all condition codes are analyzed. While data is loaded from the multi-port register file 540 into the ALU in step 624, the next address generator 530 determines the next instruction address in step 620 and determines which results of the conditions codes are to be used to determine the next executing VLIW as in step 622. At this point, the work in the processor is done when ALU parcels 711, 712, 715 are executed as in step 632 and in step 634 when a parcel 718 loads data into the CPU from data storage, either a data cache 404 or main storage 402, Simultaneously the next VLIW instruction is obtained from an instruction cache 403. Finally, the results of the condition code analysis are used to gate the results from all ALUs in step 636, so only those parcels on the "taken" branches have their execution results saved and thus condition codes are set for the next VLIW are set in step 642 when, for example, parcel 711 sets condition code 1 for the next cycle and data is saved to the appropriate memory device, whether to the multi-point register file 540, the data cache 404, or main storage 402. The same analysis of condition codes which determines "taken" branches within the instruction also determines the next VLIW instruction to be executed because each final leaf of the branching tree is the equivalent of a "GOTO" instruction and the execution control of a single VLIW ends in step 650. The invention herein describes the events and mechanisms left of the broken line in the center of FIG. 6.

Depending upon the architectural design and preference, a VLIW instruction loaded into the instruction register 500 can contain any arbitrary number of parcels, and each parcel may be any size. Exemplary VLIW instructions of eight to sixteen parcels, each having thirty-two bits or four bytes, are shown in FIGS. 8a and 8b. Details of an exemplary VLIW instruction, the format of the parcels, and the bit structure of each parcel are described in U.S. Pat. No. 5,805,850, filed Jan. 30, 1997, entitled, "Very Long Instruction Word (VLIW) Computer Having Efficient Instruction Code Format", owned by assignee, which is hereby incorporated by reference. In FIGS. 8a and 8b, BPx indicates a branch parcel having a branch condition to evaluate in the next address generator 530. Parcel 714, IF CC3-1 GOTO END, of FIG. 7 is an example of a branch parcel. RRx indicates a register to register operation wherein data is transferred from one register to another within the CPU. Of the parcels shown in FIG. 7, parcels 711, IF R2/R4 CC1=1, 712, R2=R2+4, 715, R1=R1+R8, are all examples of a RRx parcel. Also shown in FIG. 7, parcel 718, LOAD R5 FROM Addr, is an example of a RSx parcel which indicates a register to storage operation wherein data is transferred from a register within the CPU to the memory hierarchy.

Figure 9:
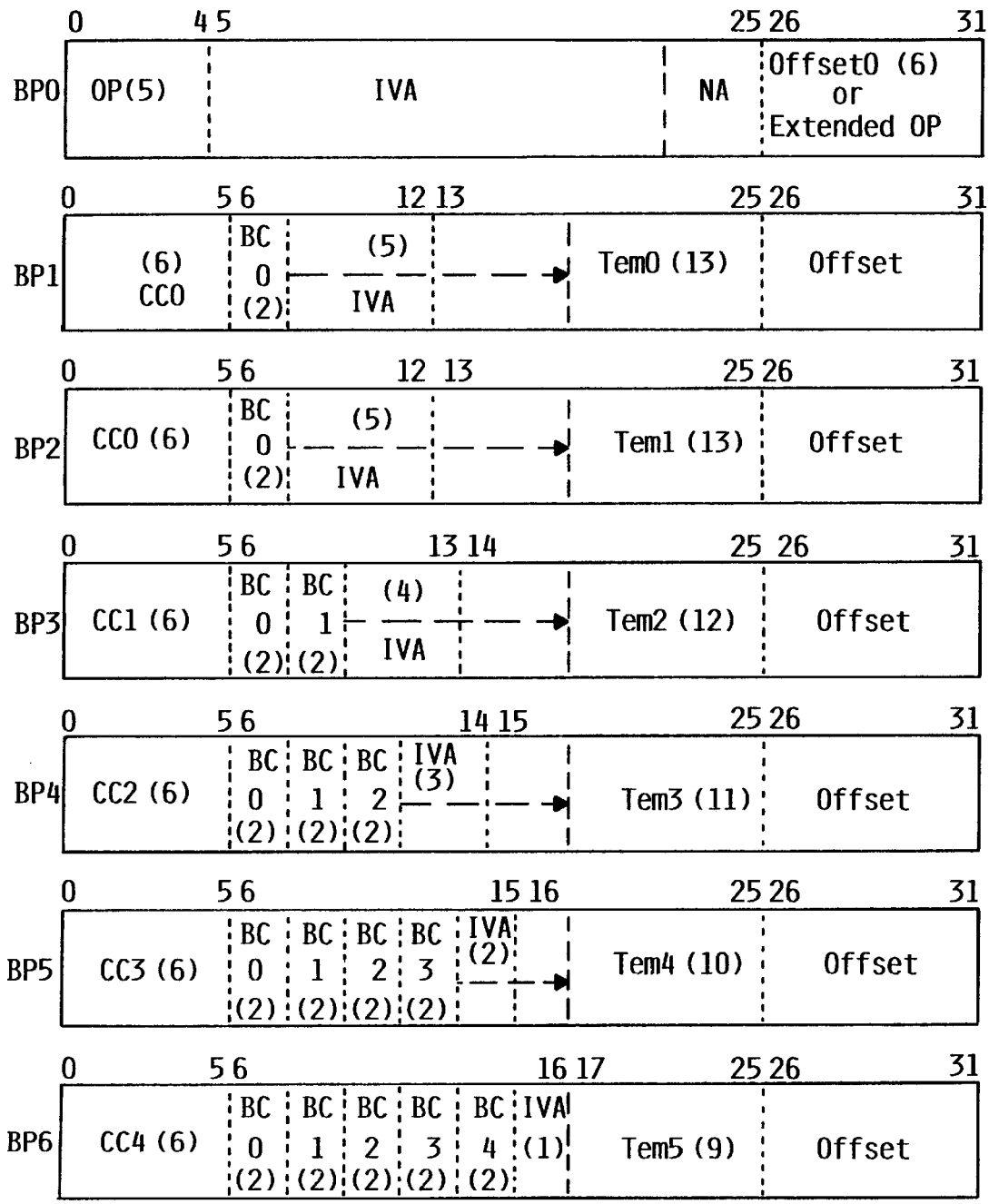
FIG. 9 illustrates the format of a branch parcel contained within a VLIW instruction.

The invention herein teaches how to determine the next VLIW instruction when there are several branches an instruction can take, so closer examination of a branch parcel is warranted. An exemplary format of the bit positions for VLIW branch parcels that supports six-way branching in a VLIW instruction is shown in FIG. 9. In a VLIW instruction, there is an assumption that every VLIW instruction will have at least one branch, even if the branch is to the next sequential instruction, determined by the combination of branch parcels BP0 and BP1 in FIGS. 8a, 8b, and 9. Branch parcels 2 through 6, BP2–BP6, shown in FIGS. 8b and 9 are optional depending upon the branch conditions of the VLIW instruction. In the case of small VLIW instructions having, for example four parcels, it may be preferable to add a bit to the VLIW instruction indicating it is a sequential VLIW instruction. Features of the branch parcels shown in FIG. 9 include:

The opcode 90 of branch parcel BP0 has bit fields which may specify the length of the VLIW, the source for the branch target, and the number of branches contained within the VLIW instruction.

The instruction virtual address (IVA) fields provide additional bits that can be used by the programmer to identify the parcel in main memory.

The next address (NA) specifies the one-kilobyte block/module of the level one instruction cache having all VLIWs that are the target of all branches within this VLIW instruction. It is concatenated onto the instruction address register to generate the entire address of the target block.

The condition code (CCX) bit select field specifies the condition register bits to be tested for branches. In the VLIW processor, the preferred maximum number of conditions bits to be tested is five.

The branch conditions (BC) fields specify the conditions that must be met for each branch to be executed. The branch condition fields correspond to the condition code bit select fields. For each condition, preferably three states are be tested: 0, 1, and X (don't care).

The target execution mask (TEM) field specifies which parcels of the current VLIW instruction should be executed if the condition codes of that parcel are satisfied.

The offset field identifies the address of the next VLIW instruction within the 1 kilobyte block that is the target of the branch. There is one offset for each branch.

To determine the next VLIW to be executed is a complex undertaking made even more critical because it is to be done in one processor cycle. Evaluation of these branch parcels in less than one cycle of processing can be accomplished by loading potential subsequent VLIWs into the level one instruction cache 403 in a specific arrangement, and simultaneously, by evaluating the branch conditions in the next address generator 530. Empirically, most VLIWs execute sequentially but, on the average, every fifth instruction will cause the execution pipeline to branch. Typically, there are three conditional branches per VLIW instruction. Although up to eight or more branch condition parcels may be within a VLIW, practicably, six branch condition parcels are sufficient for successful implementation of a VLIW computer system. More than six branch condition parcels are difficult to logically implement and rarely required. Each condition register is tested by a condition code mask. The evaluation of this mask lies on the hardware's critical path and thus is positionally encoded to speed up the decode logic. Only the results from the ALUs of those parcels which were evaluated to lie upon the branch taken path will be committed to storage into memory, whether a cache memory or main memory, and will be used in the condition code registers for the next cycle.

Figure 10:
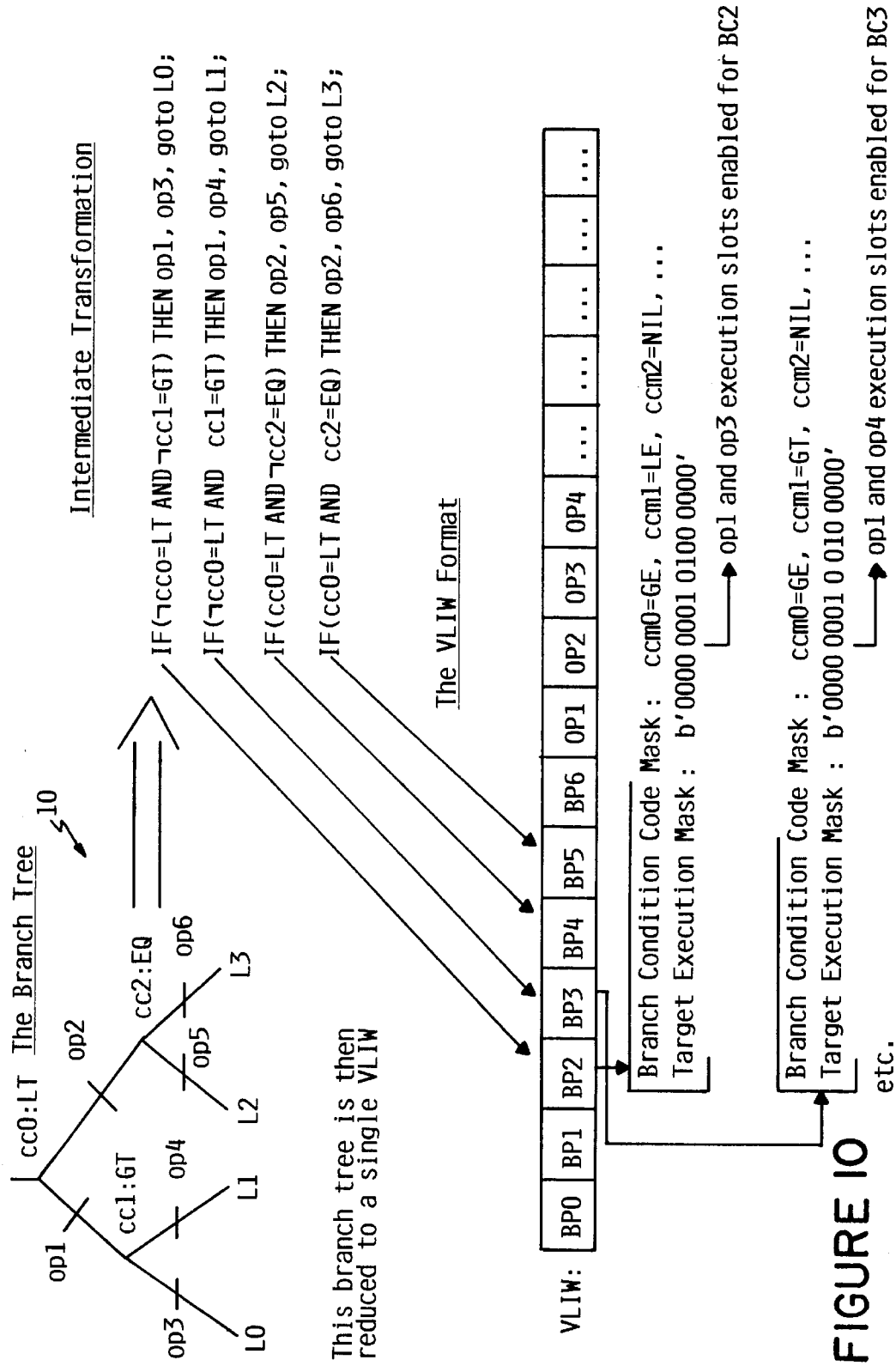
FIG. 10 is an illustration of the branching mechanism and control flow of a VLIW instruction.

Control flow having conditional branching is visually represented in FIG. 10. The next VLIW instruction is executed depending upon the results of a conditional instruction previously executed. The operations to be executed in the CPU are represented by short lines, op1 through op6, crossing the lines representing the control flow or the branches of the tree. The nodes of the tree are associated with the conditions to be evaluated: cc0, cc1, cc2 wherein the control flow can change directions. At the nodes, binary tests are performed on conditions codes; the left outgoing branch from a node corresponds to the false outcome of the test, whereas the right outgoing branch corresponds to the true outcome of the test. For instance, as shown in FIG. 10 following the left most branch, first, the condition cc0=LT is evaluated to determine if the result of the first instruction is less than some arbitrary value, commonly zero. If this is false, proceed on the left control flow path to the operation identified as op1 and evaluate the results of op1 on another condition: cc1=GT, i.e., if the results of op1 are not greater than some arbitrary value, then go to op3 and then the next instruction L0. Similarly if cco=LT is true, op2 will be executed, and then if cc2=EQ is also true, op6 will be executed and L3 will be the next instruction.

Successful implementation of VLIW architecture is dependent upon the structure of the level one instruction cache (L1 I-cache). The first requirement to accommodate up to six-way branching with zero-cycle latency is to treat the level one instruction cache closest to the processor as a control store memory typically used for microcode in many systems. It is also necessary to address the level one instruction cache directly where the instruction cache address comes entirely from the instruction, as in a full immediate address field. Alternatively, a portion of the high order address is taken from the instruction address register and the remaining low order address bits come directly from the instruction and is a subunit an absolute address of an instruction control word within a module space of N instructions.

Figure 11:
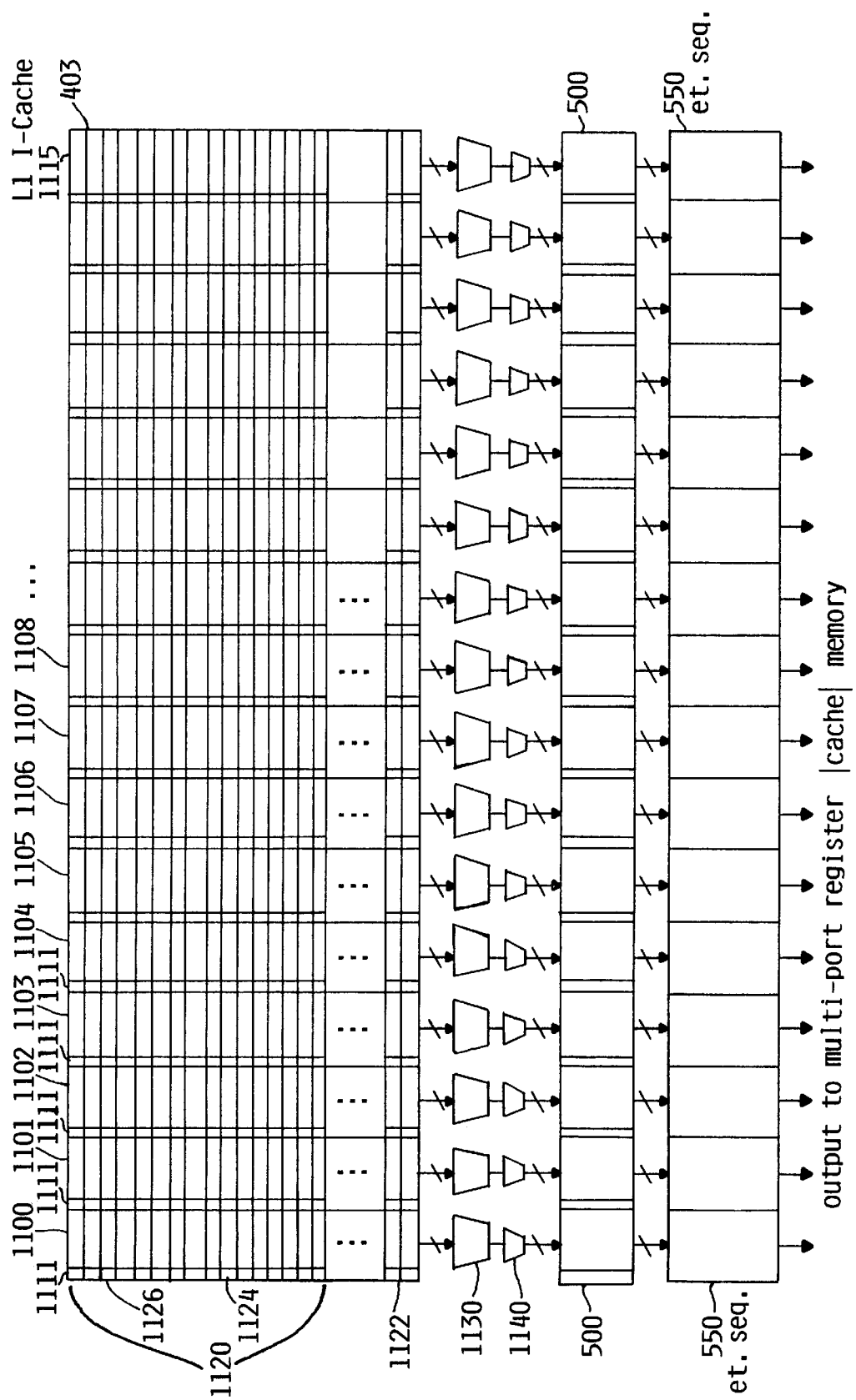
FIG. 11 represents the level one instruction cache of a VLIW computer.

The level one instruction cache (L1 I-cache) 403, shown in FIG. 11, is integrated with the CPU and, preferably, has sixty-four kilobytes arranged in column blocks or mini-Icaches 1100 of four kilobytes each. The relationship of the number of bytes in the mini-Icache and the number of bytes per VLIW instruction are related; the number of mini-Icaches can vary to accommodate processing of VLIW instructions having different field width and different parcel size. Further, it is critical to allow the level one instruction cache to be built simply as a one-port late-select array. The level one instruction cache is direct mapped to allow the fastest possible single cycle access but an associative cache will also work but will increase the access time. The level one instruction cache requires that the VLIW compiler arrange branch targets from a VLIW instruction so that all possible VLIW instructions of a previously executing VLIW instruction are contained within the same one kilobyte block of instructions aligned on boundaries of one-kilobyte, i.e., a six-way branching scheme requires all six possible target VLIW instructions to be arranged in a module of sixteen VLIW instructions of 16×64 bytes=1024 bytes.

In FIG. 11, the one-kilobyte block 1120 and the first two VLIW instructions of another one-kilobyte block 1122 are represented. Within each one kilobyte block 1120 are sixteen VLIW instructions 1124, one in each row. The invention accommodates VLIW instructions having a variable number of parcels because of the alignment of the VLIW instruction on boundaries of one-kilobyte within the level one instruction cache 403. By aligning individual parcels 1126 of each VLIW instruction 1124 in individual rows of each column 1100–1115, one VLIW may have only four or eight parcels, but the subsequent VLIW instruction may have sixteen parcels.

A critical feature of the VLIW machine is that each parcel 1126 of a VLIW instruction 1124 has the next address, the offset, and the branch conditions of each parcel replicated in each parcel before it is loaded into the instruction cache. A one-cycle preprocessor moves the branch conditions, the next addresses, the offsets to flag arrays 1310 (shown in FIG. 13), one array per parcel which then replicates each parcel before loading into the instruction cache. The smaller column 1111 contains a number of bits (eleven) of the next address of the one-kilobyte block in main memory; a consequence is that the number and value of the bits of this smaller column 1111 are the same throughout the one-kilobyte block 1120.

More than one of the one-kilobyte blocks, typically four to eight one-kilobyte blocks, of VLIW instructions are loaded from main memory into the level one instruction cache. As an example, there are eleven bits of branch address wherein eight pre-decoded bits identify the block(s) in main memory and then three encoded bits to identify the address of the one-kilobyte block within those loaded from memory. This address is also contained in the next address (NA) field of each parcel. The level one instruction cache is addressed using virtual addresses which eliminates the need to wait for a virtual-to-real address mapping. The address is obtained immediately from the VLIW instruction directly without going through an adder. Alternatively the address high-order bits are taken from one of a number of registers. The offset select 1130 and late select 1140 further decodes the offset to yield the individual VLIW instruction that will be loaded next into instruction register 500.

Figure 12A:
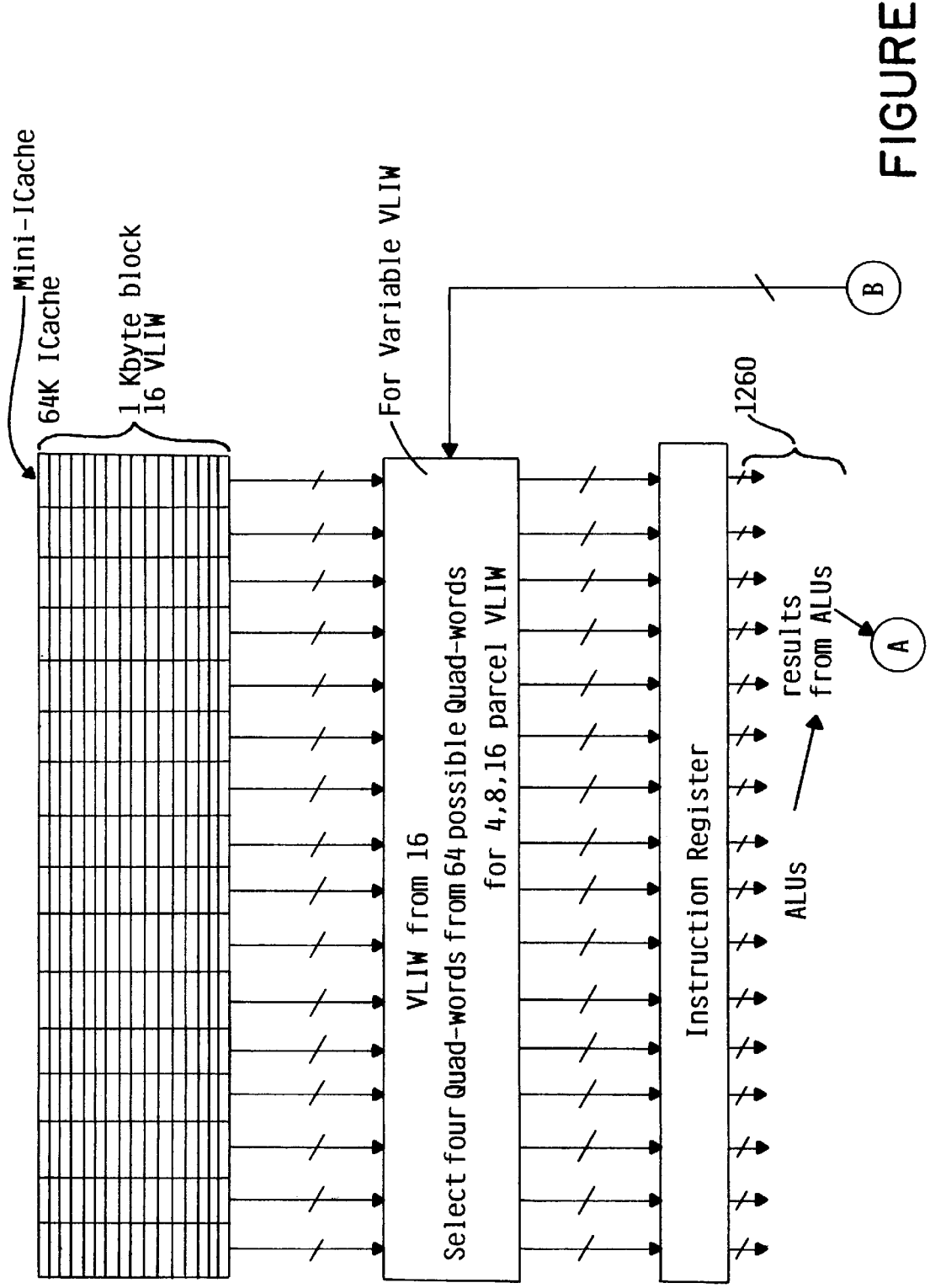
FIG. 12 is a pictorial representation of three simultaneous processes of the invention to determine the next VLIW instruction.
Figure 12B:
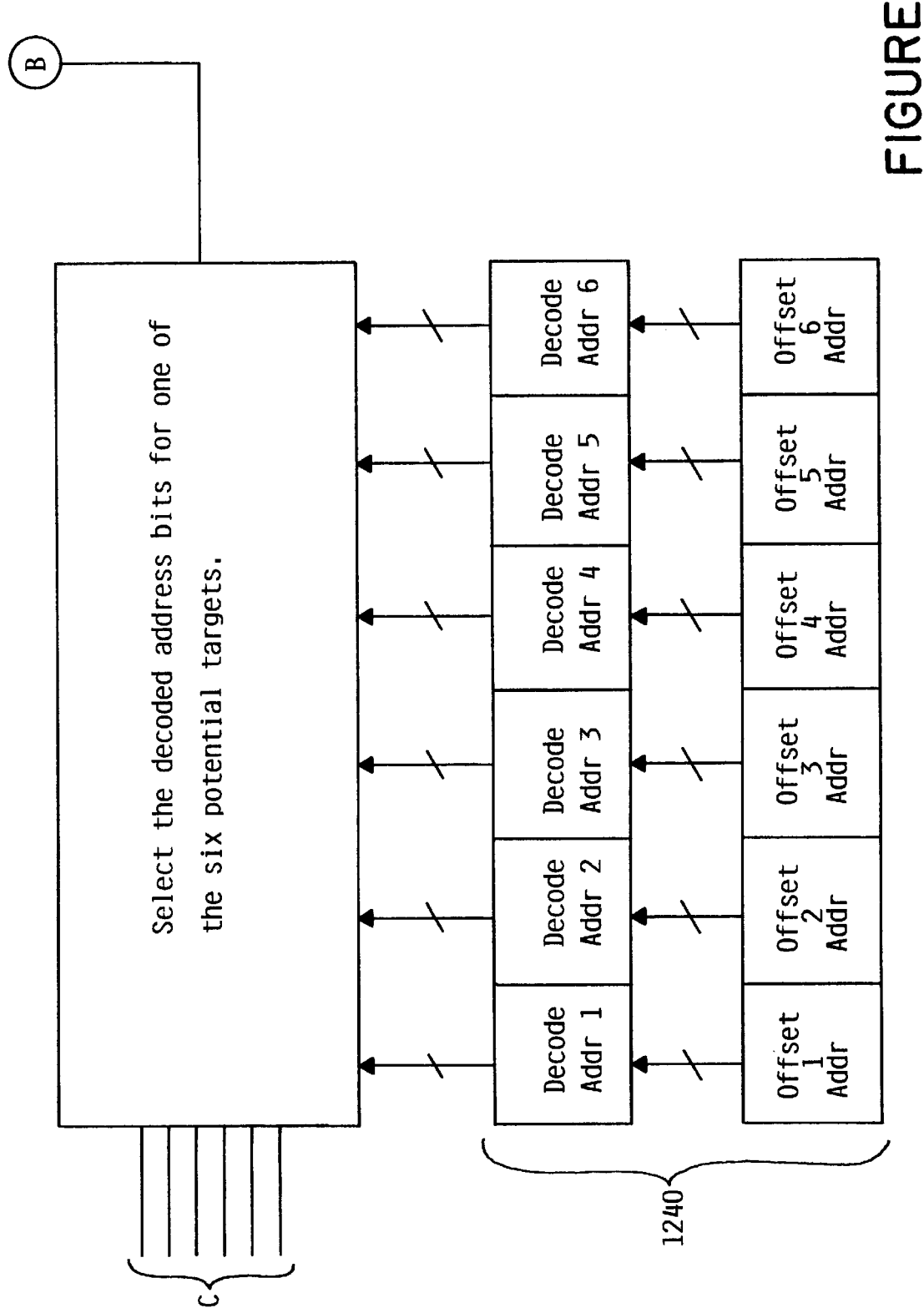
Figure 12C:
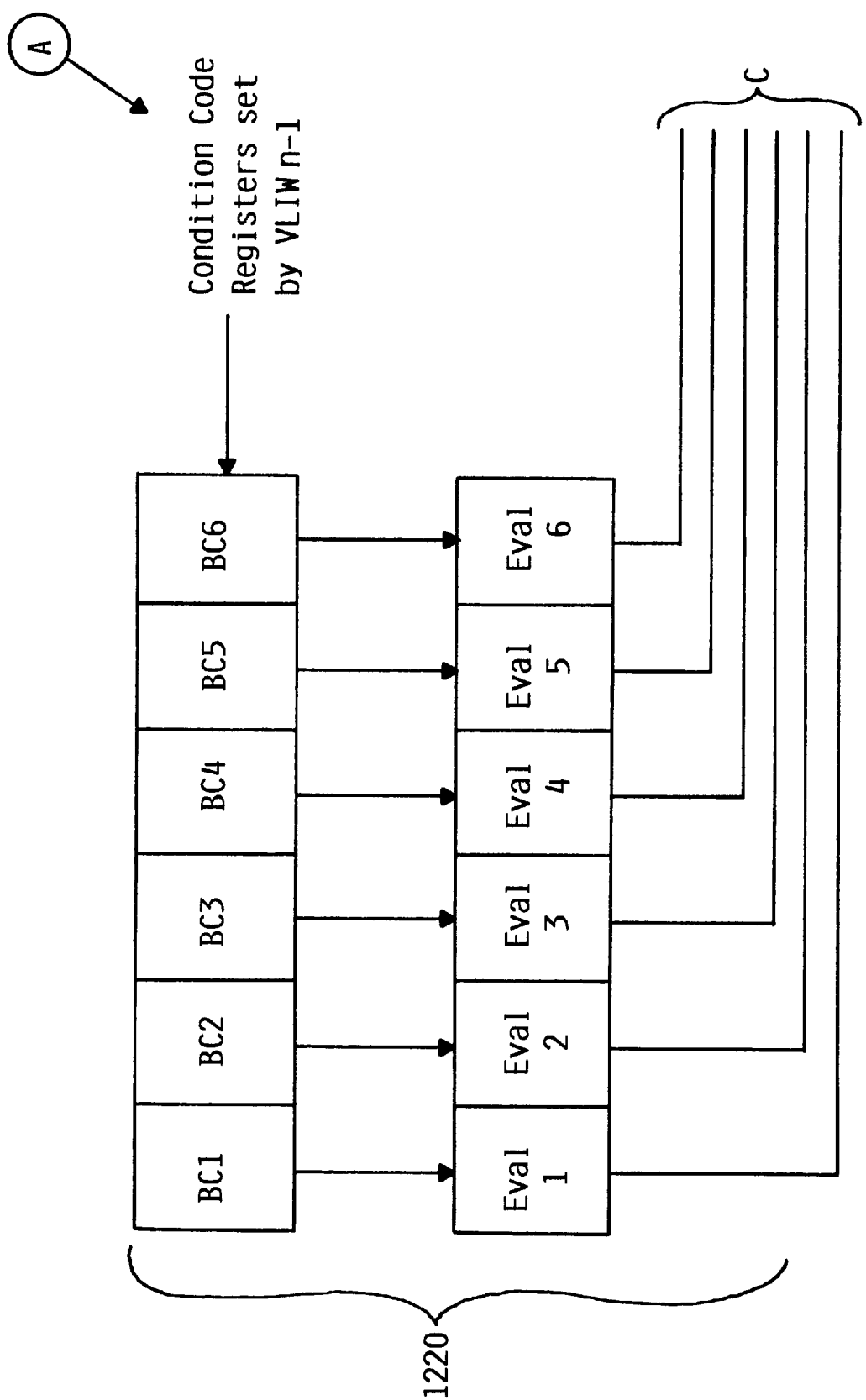

Three events shown in FIG. 12 happen concurrently. First, at 1220, all parcels of a VLIW instruction are evaluated in parallel for the same branch conditions by comparing the branch conditions with the condition code registers. The sixteen copies of the condition code registers, one per mini-Icache, were loaded by the VLIW instruction immediately preceding. Simultaneously, at 1240, all parcels undergo concurrent evaluation and decoding of all potential offset addresses to determine what is the next VLIW instruction. Upon resolution of the branch conditions to determine what conditional branch has been taken, the offset address associated with that branch is selected and this information is forwarded to the offset selects 1130 and 1140 to select the next VLIW from the sixteen VLIWs in the one-kilobyte block of the cache. Simultaneously, at 1260, all branches of a mini-Icache are executing so that the condition code registers can be loaded with the results of its execution for evaluation of the next VLIW instruction's branch conditions as well as storage of the results of the branch which has been evaluated to be the "taken" branch. The immediately preceding VLIWn−1 sets the condition codes; the VLIWn is having its branch conditions evaluated against those condition codes, is having its offset addresses decoded, and is executing all parcels to determine which results will be stored.

Thus, the design of the level one instruction cache into sixteen, and there may be more or less, mini-Icaches which operate rather autonomously permits the evaluation of all conditional branches of a VLIW instruction to determine which branch is the correct branch. Only the results of the computations and the condition codes of the correct branch are saved. The next address, the condition codes, and the branch conditions of each parcel are replicated sixteen times, or as many times as there are mini-Icaches, to permit this simultaneously evaluation. The next address represents the one-kilobyte block in the instruction cache which contains all of the target VLIW instructions of all the conditional branches. The offset addresses are decoded to determine which particular VLIW instruction of that one-kilobyte block will be the next VLIW instruction to execute.

Figure 13A:
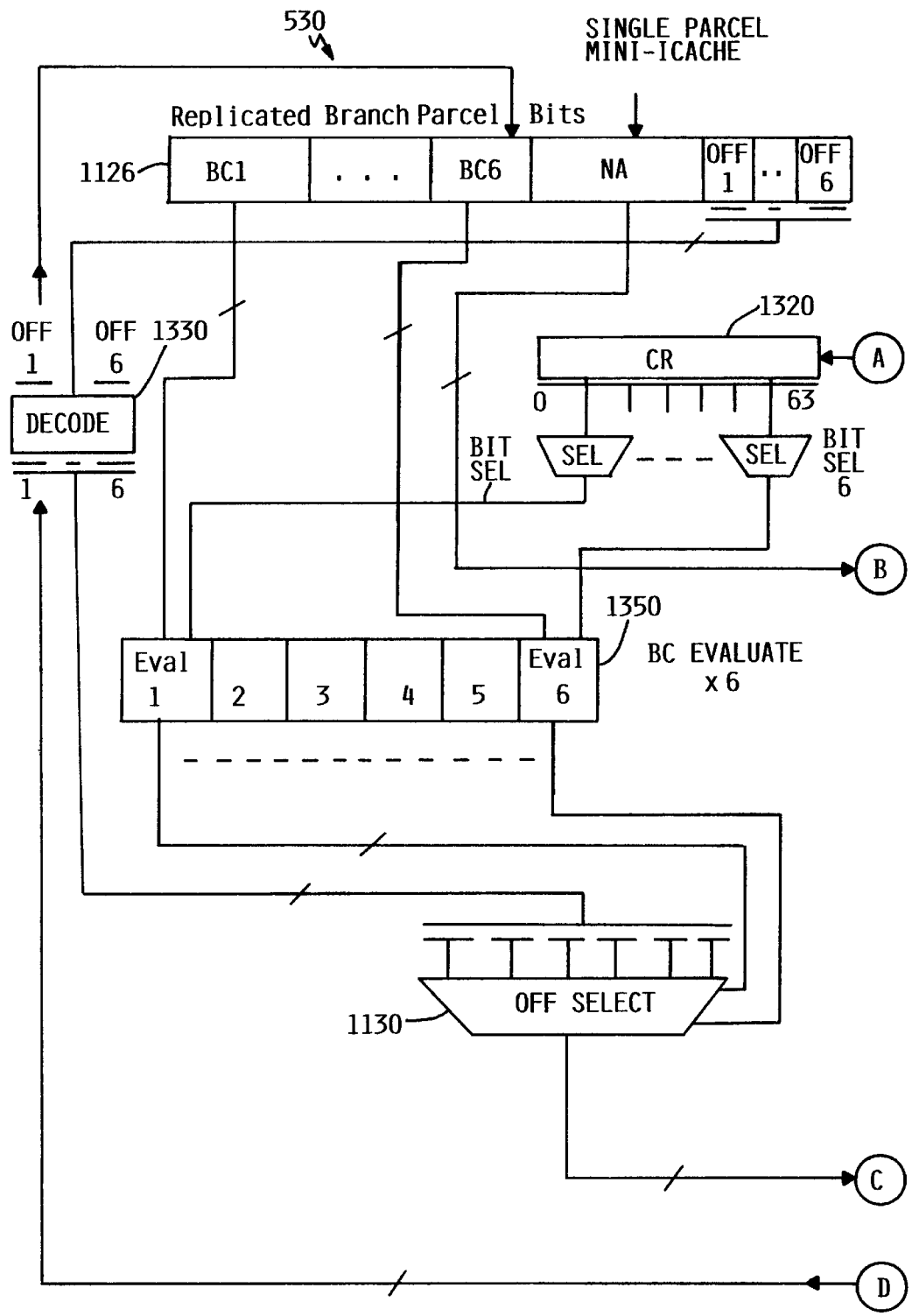
FIG. 13 is a pictorial representation of the three processes within the context of the mini-Icache.
Figure 13B:
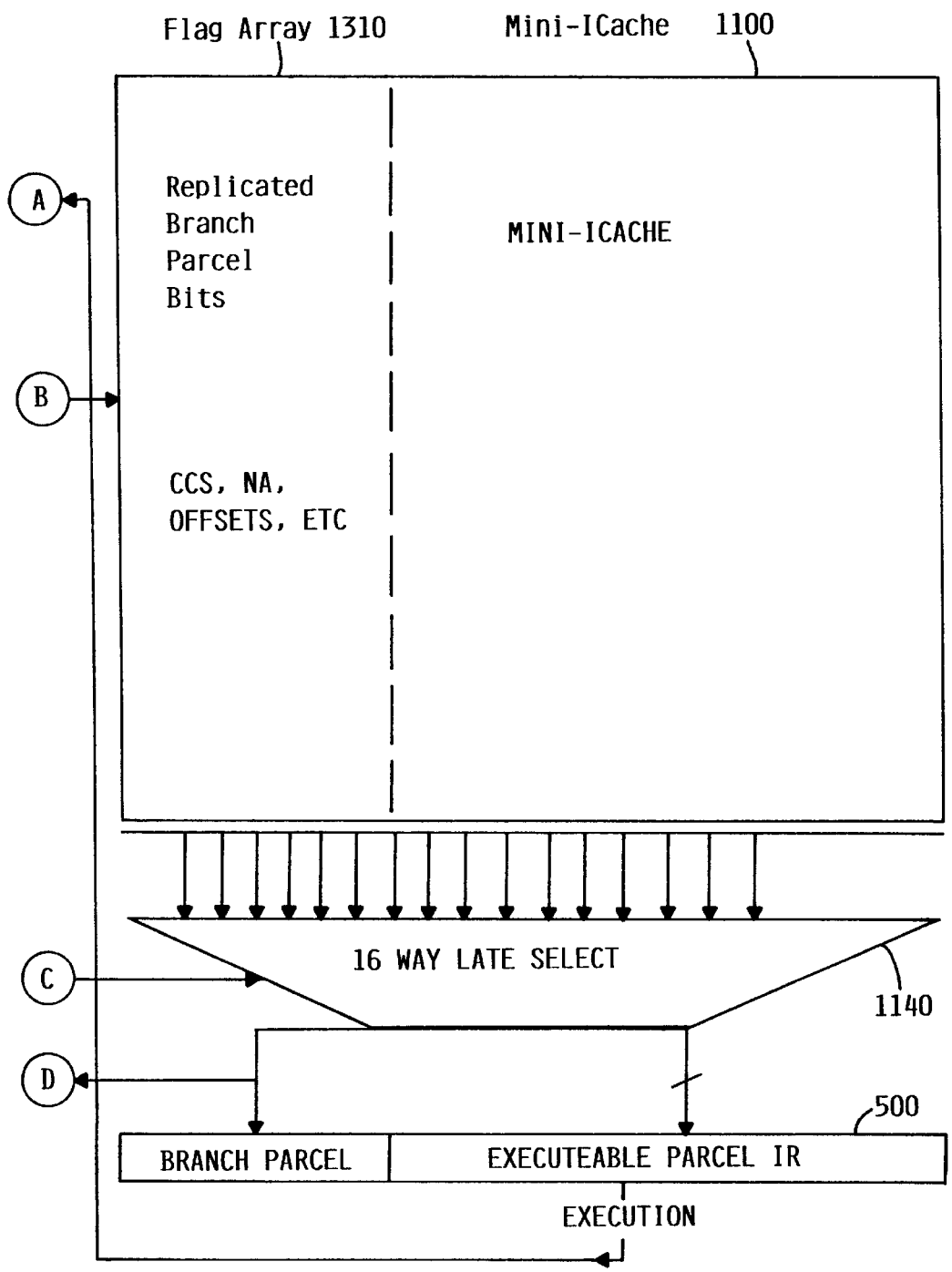

FIG. 13 illustrates the process of the invention within the context of a single autonomous mini-Icache 1100. Replicated branch parcels bits having the branch conditions, the next address, and the offsets are stored in the flag array 1310 of the mini-Icache 1100. An instruction 1126 with the replicated branch parcel bits which is being executed and evaluated in the current cycle is shown at the top of the left side of FIG. 13 for purposes of explaining the invention. The branch conditions BC1 . . . BC6 in the instruction 1126 are evaluated against the selected condition code of the condition code register 1320 in branch condition evaluation logic 1350. Values in condition code registers 1320 were determined by the execution results of the previous instruction. Simultaneously, the offsets OFF 1 . . . OFF 2 of the instruction 1126 are forwarded to offset decode logic 1330. The results of the branch condition evaluation logic are forwarded to an offset select 1130 where the decoded offsets of each of the potential subsequent instructions determined by the branch conditions are selected. These decoded addresses are then forwarded to late select 1140 to select the next instruction from the mini-Icache 1100 for the instruction register 500. The selected next instruction then becomes instruction 1126 and the process begins again.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims. For example, and as has been mentioned already, the design of the instruction cache can accommodate different number of parcels in a VLIW instruction. To enhance the flexibility of the invention, the number of mini-Icaches in the instruction cache can vary for smaller or larger number of parcels or quadwords in an instruction, as in a superscalar computer. To achieve higher operating frequency, a designer may increase the number of cycles for execution in the ALUs and reduce the pipeline.

What is claimed is:

1. A method of digital computing, comprising:
   (a) replicating all target addresses and all branch conditions contained within all branch parcels of an instruction having multiple parcels, some parcels being the branch parcels and some parcels being operational parcels, all parcels capable of independent execution in a processor;

(b) loading the instruction having multiple parcels with the replicated target addresses and branch conditions into an instruction cache;

(c) selecting the instruction for execution;

(d) executing the operational parcels in a plurality of execution units of the processor, each execution unit dedicated to a respective each one of the parcels;

(e) simultaneously evaluating all branch conditions of all branch parcels of the instruction to determine a control flow branch taken;

(f) simultaneously decoding all target addresses of the instruction with decode logic circuits;

(g) correlating one each of the evaluated branch conditions to one each of the decoded target addresses, and to the execution results of the operational parcels, and, as a result, (h) selecting the control flow branch taken for execution;

(i) storing the execution results of the control flow branch taken; and (j) selecting a next instruction of the control flow branch taken for execution.

2. The method of claim 1, wherein the step (g) of storing the execution results of the control flow branch taken further comprises:

(g1) storing the execution results in memory; and (g2) storing a plurality of condition codes resulting from the execution results in the plurality of condition code registers.

3. The method of claim 2, wherein the step (a) of replicating all target addresses further comprises:

(a1) replicating all of a plurality of offsets, each offset associated with a branch parcel; and the step of (f) of simultaneously decoding all target addresses with decode logic circuits further comprises:

(f1) decoding all the replicated offsets.

4. The method of claim 2, wherein the step (e) of evaluating all branch conditions of all branch parcels of the instruction further comprises:

(e1) comparing one each of the branch conditions with one each of the plurality of condition codes, respectively from the plurality of condition code registers.

5. A method of computing, comprising:

(a) compiling up to N primitive computer operations that can be executed in parallel into a first instruction; the first instruction comprising at least N parcels, some of which are branch parcels having target addresses of subsequent instructions and branch conditions to be evaluated to determine a second instruction and some of which are operational parcels for execution in a computer processor;

(b) replicating all target addresses and all branch conditions of N parcels of the first instruction N times for storage in an instruction cache;

(c) storing all possible subsequent instructions indicated by all target addresses in all branch parcels of the first instruction in a specified section of an instruction cache identified by a next address, each possible subsequent instruction individually addressed by an offset;

(d) aligning each one of the N parcels having the replicated target addresses and branch conditions into each one of a plurality of mini-caches in the instruction cache;

(e) evaluating all branch conditions of the first instruction N times simultaneously to determine which of all possible subsequent instructions will be the second instruction;

(f) simultaneous with step (e), decoding all offsets of the first instruction N times to select the target address corresponding to the second instruction; and (g) simultaneous with step (f), executing all operational parcels of the first instruction to determine at least one condition code for the second instruction and to store results of the operational parcels in at least one register and/or memory;

(h) communicating to the instruction cache the target address of the second instruction and communicating the at least one condition code resulting from the first instruction to at least one condition code register.

6. A computer processor, comprising:

(a) an instruction cache having columns aligned into N minicaches and rows aligned into a plurality of parcels, any number of parcels comprising an instruction, each of the parcels being physically located in one of the N minicaches;

(b) N target address select circuits, each directly connected to a respective one of the N minicaches, to decode N target addresses to select the instruction to deliver to the instruction register;

(c) an instruction register to receive and initiate execution of the instruction, the instruction register having L branch parcels where L is less than or equal to N, each of L branch parcels having L target addresses for subsequent instructions, and L branch conditions, and the instruction register further having M operational parcels;

(d) N execution units, at least one of the N execution units operationally connected to a respective one of M operational parcels to execute the operational parcels;

(e) offset address decode logic operationally connected to the N select circuits which decodes all target addresses in each of the L branch parcels; and (f) condition code registers operationally connected to the N target address select circuits which evaluates each of the L branch parcels.

7. The computer processor of claim 6, in which the instruction cache is further arranged into a plurality of blocks, and all target addresses of the L branch parcels comprise a next address and L offset addresses, and the next address indicates a selected one of the plurality of blocks in which all subsequent instructions indicated by all target addresses are stored and each of the L offset addresses indicates an individual instruction in the selected one of the plurality of blocks.

8. The computer processor of claim 6, wherein the instruction may occupy an entire row of the instruction cache and each one of the parcels is physically located in each of the N mini-caches and (L+M)=N.

9. The computer processor of claim 6, wherein the instruction may occupy less than an entire row of the instruction cache and each one of the parcels is being physically located in each of the N mini-caches and (L+M)<N.

10. The computer processor of claim 6, wherein the instruction may occupy more than one row of the instruction cache and each one of the parcels is physically located in each one of the N mini-caches and (L+M)>N.

11. The computer processor of claim 8 where (L+M)=N=16.

12. The computer processor of claim 9 where N=16 and (L+M)=4 or 8.

13. The computer processor of claim 10 where N=16 and (L+M)=32 or 64.

14. A data processing system, comprising:
(a) a central processing unit comprising a processor capable of executing an instruction having multiple parcels each of which can be executed in parallel, an instruction cache divided into mini-Icaches, each of which correspond to a parcel in the instruction, branch condition evaluation logic unit connected to at least one condition code register and offset decode logic unit, a late select connected to an instruction register, a plurality of execution units, a plurality of registers including the at least one condition code register and a multi-point register file, a plurality of cache memories, a main memory; wherein the execution units, the logic units, the late select unit, the registers, the memories, the instruction register, and the instruction cache are functionally interconnected;
(b) a plurality of external connections comprising a bus interface, a bus, at least one input/output processor connected to at least one of the following: a tape drive, a data storage device, a computer network, a fiber optics communication, a workstation, a peripheral device, an information network; any of which are capable of transmitting data and instructions to the central processing unit over the bus;
wherein the selection of a next instruction is accomplished by the replication of all branch conditions, a next address, and all offset addresses of possible next instructions resulting from the execution and evaluation of the instruction and storage of all replicated information in the instruction cache; and all possible next instructions are loaded into the instruction cache in a block specified by the next address; and the condition code registers and the branch condition evaluation logic unit evaluates all branch conditions and the offset decode logic decodes all offset addresses of the instruction and the branch condition evaluation logic communicates to the at least one condition code register and at least one of the other registers to save only those results of the branch condition evaluation logic which determines the next instruction and the offset decode logic and the late select the next instruction from the instruction cache for the instruction register.

15. A method of computer processing, comprising:
(a) replicating all branch information of an instruction to be executed in a processor;
(b) aligning the replicated branch information of the instruction into an instruction cache into N mini-caches, wherein each mini-cache contains all the replicated branch information; and
(c) simultaneously evaluating all the branch information to determine the next instruction to be executed in the processor.

16. An apparatus for computer processing, comprising:
(a) means to replicate all branch parcels in an instruction having at least one branch parcel and at least one operational parcel which can be executed in parallel;
(b) means to store the instruction with the replicated branch parcels in an instruction cache such that one each of the replicated parcels and one each of the operational parcels are stored in one each mini-Icache;
(c) means to store all possible next instructions in a same block in the instruction cache;
(d) means to select the instruction into an instruction register;
(d) means to evaluate all branch conditions in all branch parcels of the instruction simultaneously in all mini-Icaches;
(e) means to decode all addresses of all possible next instructions of the instruction simultaneously in all mini-Icaches concurrently with step (d);
(f) means to execute all operational parcels of the instruction concurrently with steps (d) and (e);
(g) means to correlate results of the evaluating means to the decoding means to the execution means; and
(h) means to select the next instruction from the instruction cache to the instruction register.

17. An instruction cache for use in computer processing, comprising:
(a) a memory connection to a main memory for receiving a plurality of instructions, each instruction having multiple execution parcels capable of independent execution and/or evaluation;
(b) a plurality of mini-Icaches, each mini-Icache arranged to contain only one execution parcel of the instruction; and
(c) a connection to an instruction register to convey each of the parcels for independent initiation of execution and/or evaluation of the parcel.

* * * * *